(12) United States Patent
Rahman et al.

(10) Patent No.: US 12,244,537 B2
(45) Date of Patent: Mar. 4, 2025

(54) METHOD AND APPARATUS FOR CSI MEASUREMENT AND REPORTING

(71) Applicant: Samsung Electronics Co., Ltd., Suwon-si (KR)

(72) Inventors: Md. Saifur Rahman, Plano, TX (US); Eko Onggosanusi, Coppell, TX (US); Dalin Zhu, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 17/673,621

(22) Filed: Feb. 16, 2022

(65) Prior Publication Data

US 2022/0263633 A1 Aug. 18, 2022

Related U.S. Application Data

(60) Provisional application No. 63/302,317, filed on Jan. 24, 2022, provisional application No. 63/300,774,
(Continued)

(51) Int. Cl.
*H04W 4/00* (2018.01)
*H04L 5/00* (2006.01)
*H04W 24/10* (2009.01)

(52) U.S. Cl.
CPC .......... *H04L 5/0057* (2013.01); *H04W 24/10* (2013.01)

(58) Field of Classification Search
CPC .............................. H04L 5/0057; H04W 24/10
See application file for complete search history.

(56) References Cited

U.S. PATENT DOCUMENTS

2014/0086187 A1 3/2014 Kang et al.
2017/0201970 A1 7/2017 Takano
(Continued)

FOREIGN PATENT DOCUMENTS

WO 2020/056708 A1 3/2020
WO 2020/144602 A1 7/2020

OTHER PUBLICATIONS

"LTE; Evolved Universal Terrestrial Radio Access (E-UTRA); Physical channels and modulation (3GPP TS 36.211 version 16.3.0 Release 16)", ETSI TS 136 211 V16.3.0, Nov. 2020, 251 pages.
(Continued)

*Primary Examiner* — Elisabeth Benoit Magloire

(57) ABSTRACT

A method for operating a user equipment (UE) comprises receiving at least one channel state information (CSI) report setting about a first type of quantities CSI(1), . . . , CSI($N_{RRH}$) for $N_{RRH}>1$ remote radio heads (RRHs), each RRH comprising a group of CSI reference signal (CSI-RS) ports, wherein $N_{RRH}$=a number of RRHs; receiving at least one CSI-RS resource setting about a second type of quantities CSI-RS(1), . . . , CSI-RS($N_{RRH}$) transmitted from $N_{RRH}$ groups of CSI-RS ports, wherein at least one of the at least one CSI report setting or the at least one CSI-RS resource setting is not equal to $N_{RRH}$; and based on the at least one CSI report setting and the at least one CSI-RS resource setting: measuring CSI-RS(1), . . . , CSI-RS($N_{RRH}$); and determining, based on the measurement, CSI(1), . . . , CSI($N_{RRH}$); and transmitting CSI(1), . . . , CSI($N_{RRH}$).

19 Claims, 12 Drawing Sheets

Related U.S. Application Data filed on Jan. 19, 2022, provisional application No. 63/153,044, filed on Feb. 24, 2021, provisional application No. 63/150,988, filed on Feb. 18, 2021.

(56) References Cited

U.S. PATENT DOCUMENTS

| | | | |
|---|---|---|---|
| 2020/0373985 | A1 | 11/2020 | Tsai |
| 2023/0344578 | A1* | 10/2023 | Khoshnevisan ...... H04L 5/0057 |
| 2023/0387993 | A1* | 11/2023 | Liu ...................... H04B 7/0626 |
| 2024/0039598 | A1* | 2/2024 | Kim ................... H04L 25/0224 |
| 2024/0063870 | A1* | 2/2024 | Gao ...................... H04L 5/0057 |
| 2024/0089773 | A1* | 3/2024 | Matsumura ........... H04W 72/04 |

OTHER PUBLICATIONS

"LTE; Evolved Universal Terrestrial Radio Access (E-UTRA); Multiplexing and channel coding (3GPP TS 36.212 version 16.3.0 Release 16)", ETSI TS 136 212 V16.3.0, Nov. 2020, 259 pages.
"LTE; Evolved Universal Terrestrial Radio Access (E-UTRA); Physical layer procedures (3GPP TS 36.213 version 16.3.0 Release 16)", ETSI TS 136 213 V16.3.0, Nov. 2020, 579 pages.
"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.
"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.
"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.
"5G; NR; Multiplexing and channel coding (3GPP TS 38.212 version 16.3.0 Release 16)", ETSI TS 138 212 V16.3.0, Nov. 2020, 155 pages.
"5G; NR; Physical layer procedures for data (3GPP TS 38.214 version 16.3.0 Release 16)", ETSI TS 138 214 V16.3.0, Nov. 2020, 169 pages.
International Search Report dated May 30, 2022 in connection with International Patent Application PCT/KR2022/002416, 3 pages.
Written Opinion of the International Searching Authority dated May 30, 2022 in connection with International Patent Application PCT/KR2022/002416, 4 pages.
Extended European Search Report issued Feb. 6, 2024 regarding Application No. 22756542.1, 10 pages.
Ericsson, "CSI feedback for multi-TRP", 3GPP TSG-RAN WG1 #91, R1-1720974, Nov. 2017, 9 pages.
"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.0.0, Mar. 2020, 107 pages.

* cited by examiner

METHOD AND APPARATUS FOR CSI MEASUREMENT AND REPORTING

CROSS-REFERENCE TO RELATED APPLICATIONS AND CLAIM OF PRIORITY

The present application claims priority to U.S. Provisional Patent Application No. 63/150,988, filed on Feb. 18, 2021, U.S. Provisional Patent Application No. 63/153,044, filed on Feb. 24, 2021, U.S. Provisional Patent Application No. 63/300,774, filed on Jan. 19, 2022, and U.S. Provisional Patent Application No. 63/302,317, filed on Jan. 24, 2022. The content of the above-identified patent documents are incorporated herein by reference.

TECHNICAL FIELD

The present disclosure relates generally to wireless communication systems and more specifically to a method and apparatus for channel state information measurement and reporting.

BACKGROUND

Understanding and correctly estimating the channel between a user equipment (UE) and a base station (BS) (e.g., gNode B (gNB)) is important for efficient and effective wireless communication. In order to correctly estimate the downlink (DL) channel conditions, the gNB may transmit a reference signal (RS), e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses for channel state interference measurement and reporting.

In one embodiment, a UE for CSI reporting in a wireless communication system is provided. The UE includes a transceiver configured to: receive at least one channel state information (CSI) report setting about a first type of quantities CSI(1), ..., CSI($N_{RRH}$) for $N_{RRH}$>1 remote radio heads (RRHs), each RRH comprising a group of CSI reference signal (CSI-RS) ports, wherein $N_{RRH}$=a number of RRHs; and receive at least one CSI-RS resource setting about a second type of quantities CSI-RS(1), ..., CSI-RS($N_{RRH}$) transmitted from $N_{RRH}$ groups of CSI-RS ports, wherein at least one of the at least one CSI report setting or the at least one CSI-RS resource setting is not equal to $N_{RRH}$. The UE further includes a processor operably connected to the transceiver. The processor is configured to: based on the at least one CSI report setting and the at least one CSI-RS resource setting: measure CSI-RS(1), ..., CSI-RS($N_{RRH}$); and determine, based on the measurement, CSI(1), ..., CSI($N_{RRH}$). The transceiver is further configured to transmit CSI(1), ..., CSI($N_{RRH}$).

In another embodiment, a BS in a wireless communication system is provided. The BS includes a processor configured to generate at least one CSI report setting about a first type of quantities CSI(1), ..., CSI($N_{RRH}$) for $N_{RRH}$>1 RRHs, each RRH comprising a group of CSI-RS ports, wherein $N_{RRH}$=a number of RRHs; and generate at least one CSI-RS resource setting about a second type of quantities CSI-RS(1), ..., CSI-RS($N_{RRH}$) transmitted from $N_{RRH}$ groups of CSI-RS ports, wherein at least one of the at least one CSI report setting or the at least one CSI-RS resource setting is not equal to $N_{RRH}$. The BS further includes a transceiver operably connected to the processor. The transceiver is configured to: transmit the at least one CSI report setting and the at least one CSI-RS resource setting; transmit CSI-RS(1), ..., CSI-RS($N_{RRH}$); and receive CSI(1), ..., CSI($N_{RRH}$), wherein CSI(1), ..., CSI($N_{RRH}$) is based on the at least one CSI report setting, the at least one CSI-RS resource setting, and CSI-RS(1), ..., CSI-RS($N_{RRH}$).

In yet another embodiment, a method for operating a UE is provided. The method comprises: receiving at least one CSI report setting about a first type of quantities CSI(1), ..., CSI($N_{RRH}$) for $N_{RRH}$>1 RRHs, each RRH comprising a group of CSI-RS ports, wherein $N_{RRH}$=a number of RRHs; receiving at least one CSI-RS resource setting about a second type of quantities CSI-RS(1), ..., CSI-RS($N_{RRH}$) transmitted from $N_{RRH}$ groups of CSI-RS ports, wherein at least one of the at least one CSI report setting or the at least one CSI-RS resource setting is not equal to $N_{RRH}$; and based on the at least one CSI report setting and the at least one CSI-RS resource setting: measuring CSI-RS(1), ..., CSI-RS($N_{RRH}$); and determining, based on the measurement, CSI(1), ..., CSI($N_{RRH}$); and transmitting CSI(1), ..., CSI($N_{RRH}$).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
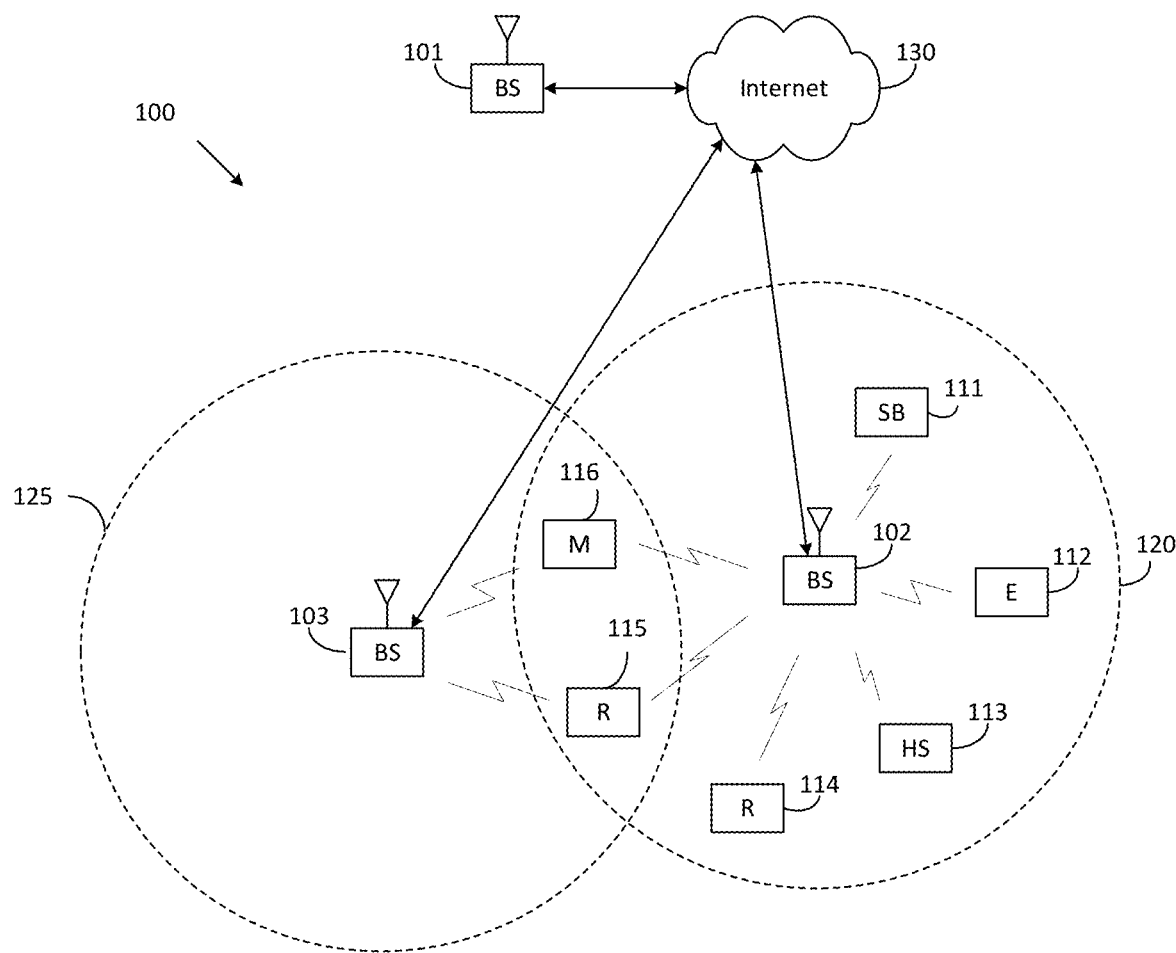
FIG. 1 illustrates an example wireless network according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TR 22.891 v14.2.0 (herein "REF 6"); 3GPP TS 38.212 v17.0.0, "E-UTRA, NR, Multiplexing and channel coding" (herein "REF 7"); and 3GPP TS 38.214 v17.0.0, "E-UTRA, NR, Physical layer procedures for data" (herein "REF 8").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D)

communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
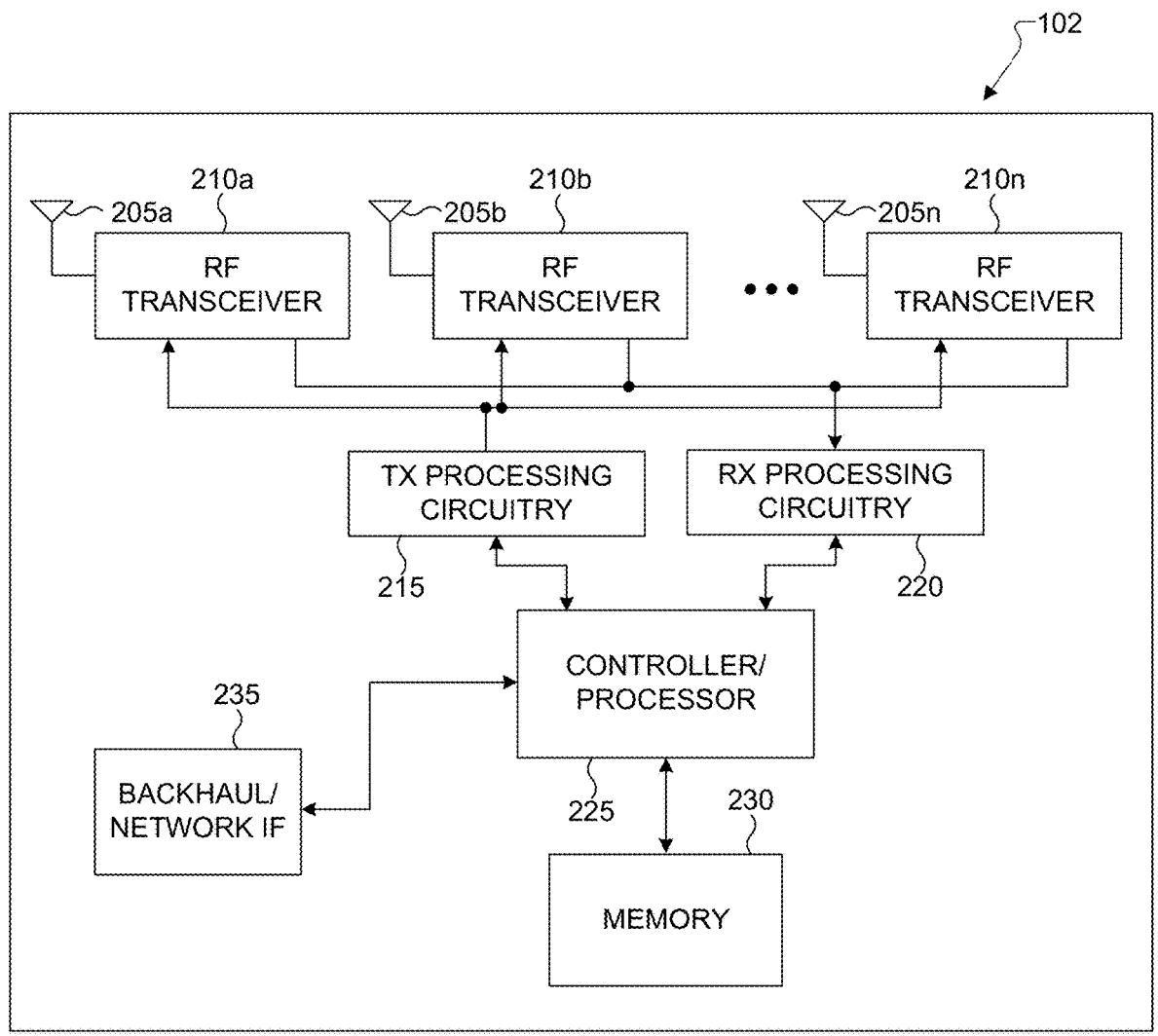
FIG. 2 illustrates an example gNB according to embodiments of the present disclosure.
Figure 3:
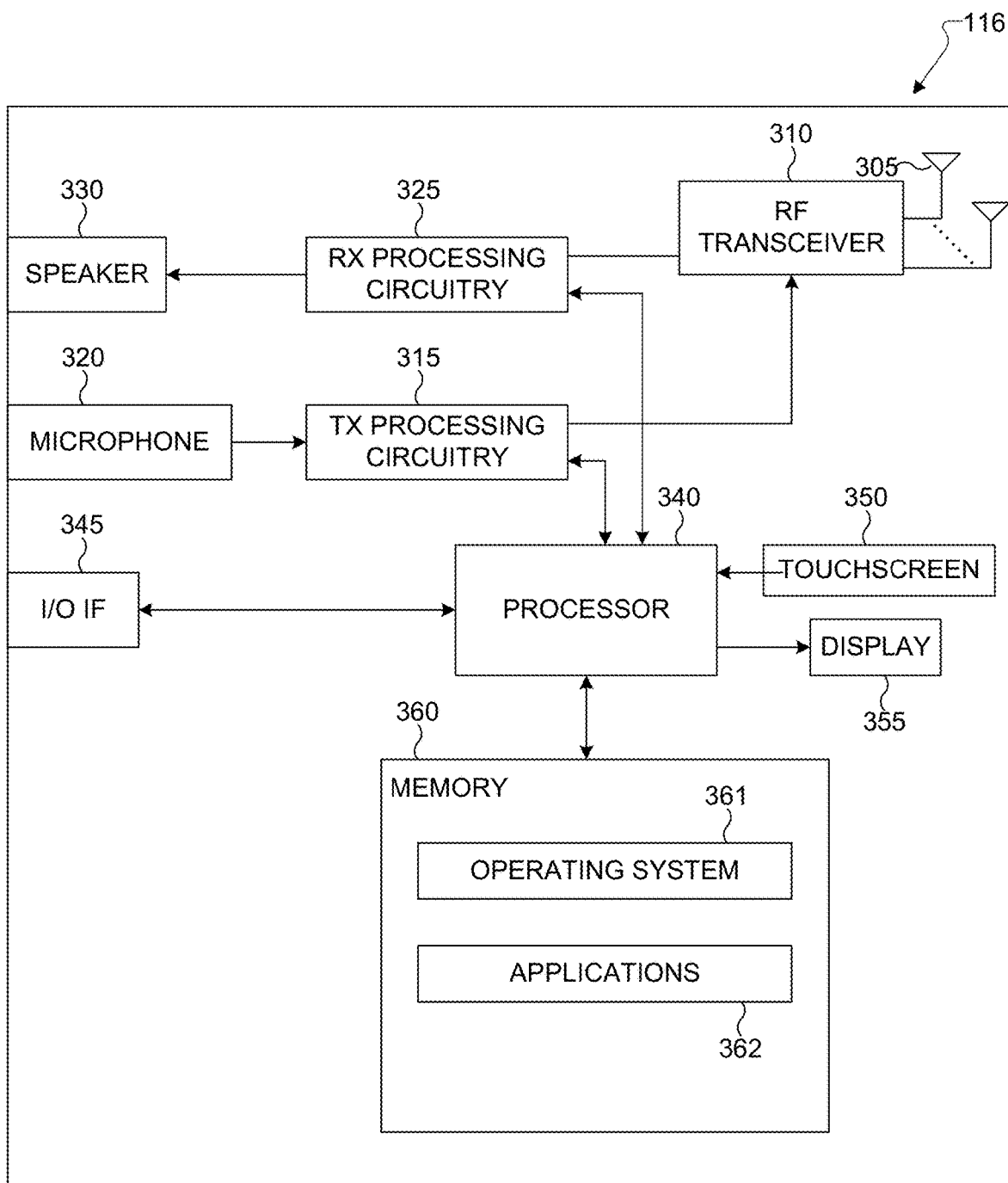
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for receiving at least one channel state information (CSI) report setting about a first type of quantities CSI(1), ..., CSI($N_{RRH}$) for $N_{RRH}>1$ remote radio heads (RRHs), each RRH comprising a group of CSI reference signal (CSI-RS) ports, wherein $N_{RRH}$=a number of RRHs; receiving at least one CSI-RS resource setting about a second type of quantities CSI-RS(1), ..., CSI-RS($N_{RRH}$) transmitted from $N_{RRH}$ groups of CSI-RS ports, wherein at least one of the at least one CSI report setting or the at least one CSI-RS resource setting is not equal to $N_{RRH}$; and based on the at least one CSI report setting and the at least one CSI-RS resource setting: measuring CSI-RS(1), ..., CSI-RS($N_{RRH}$); and determining, based on the measurement, CSI(1), ..., CSI($N_{RRH}$); and transmitting CSI(1), ..., CSI($N_{RRH}$). One or more of the gNBs 101-103 includes circuitry, programing, or a combination thereof, for generating at least one channel state information (CSI) report setting about a first type of quantities CSI(1), ..., CSI ($N_{RRH}$) for $N_{RRH}>1$ remote radio heads (RRHs), each RRH comprising a group of CSI reference signal (CSI-RS) ports, wherein $N_{RRH}$=a number of RRHs; generating at least one CSI-RS resource setting about a second type of quantities CSI-RS(1), ..., CSI-RS($N_{RRH}$) transmitted from $N_{RRH}$ groups of CSI-RS ports, wherein at least one of the at least one CSI report setting or the at least one CSI-RS resource setting is not equal to $N_{RRH}$; transmitting the at least one CSI report setting and the at least one CSI-RS resource setting; transmitting CSI-RS(1), ..., CSI-RS($N_{RRH}$); and receiving CSI(1), ..., CSI($N_{RRH}$), wherein CSI(1), ..., CSI($N_{RRH}$) is based on the at least one CSI report setting, the at least one CSI-RS resource setting, and CSI-RS(1), ..., CSI-RS ($N_{RRH}$).

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving at least one channel state information (CSI) report setting about a first type of quantities $CSI(1), \ldots, CSI(N_{RRH})$ for $N_{RRH}>1$ remote radio heads (RRHs), each RRH comprising a group of CSI reference signal (CSI-RS) ports, wherein $N_{RRH}$=a number of RRHs; receiving at least one CSI-RS resource setting about a second type of quantities $CSI-RS(1), \ldots, CSI-RS(N_{RRH})$ transmitted from $N_{RRH}$ groups of CSI-RS ports, wherein at least one of the at least one CSI report setting or the at least one CSI-RS resource setting is not equal to $N_{RRH}$; and based on the at least one CSI report setting and the at least one CSI-RS resource setting: measuring $CSI-RS(1), \ldots, CSI-RS (N_{RRH})$; and determining, based on the measurement, $CSI(1), \ldots, CSI(N_{RRH})$; and transmitting $CSI(1), \ldots, CSI(N_{RRH})$. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
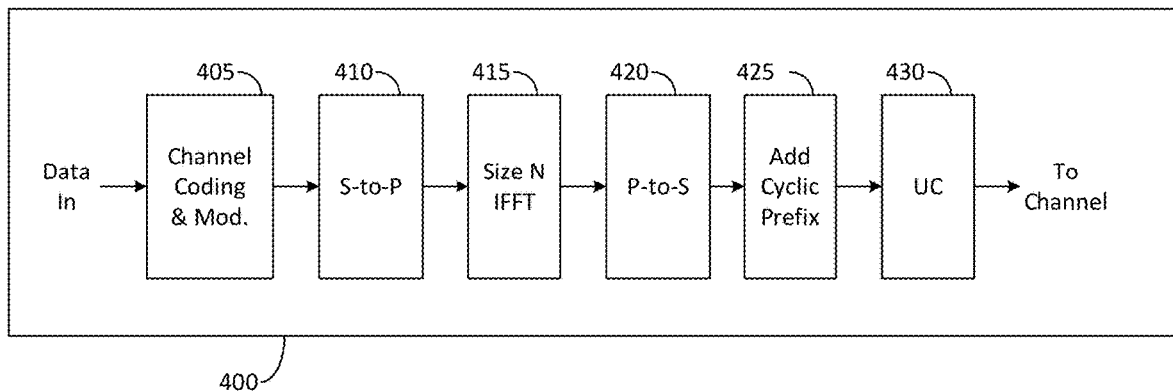
FIG. 4A illustrates a high-level diagram of an orthogonal frequency division multiple access transmit path according to embodiments of the present disclosure.
Figure 4B:
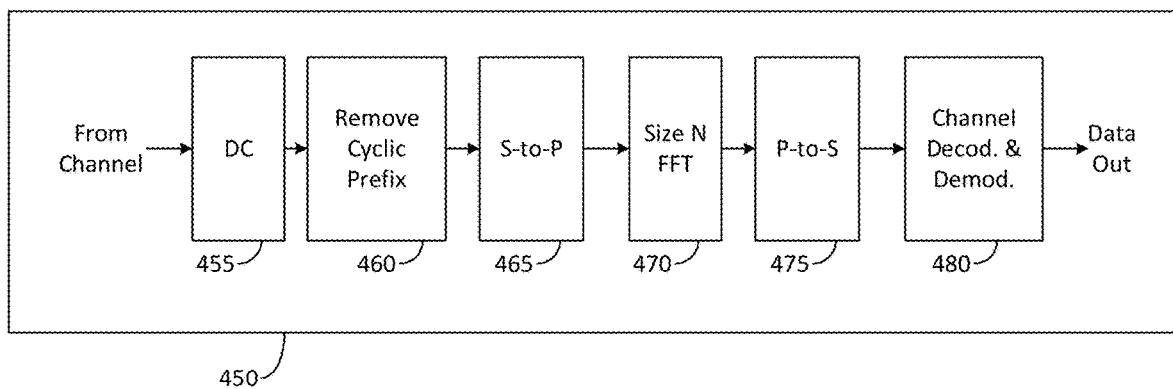
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe (or slot) includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
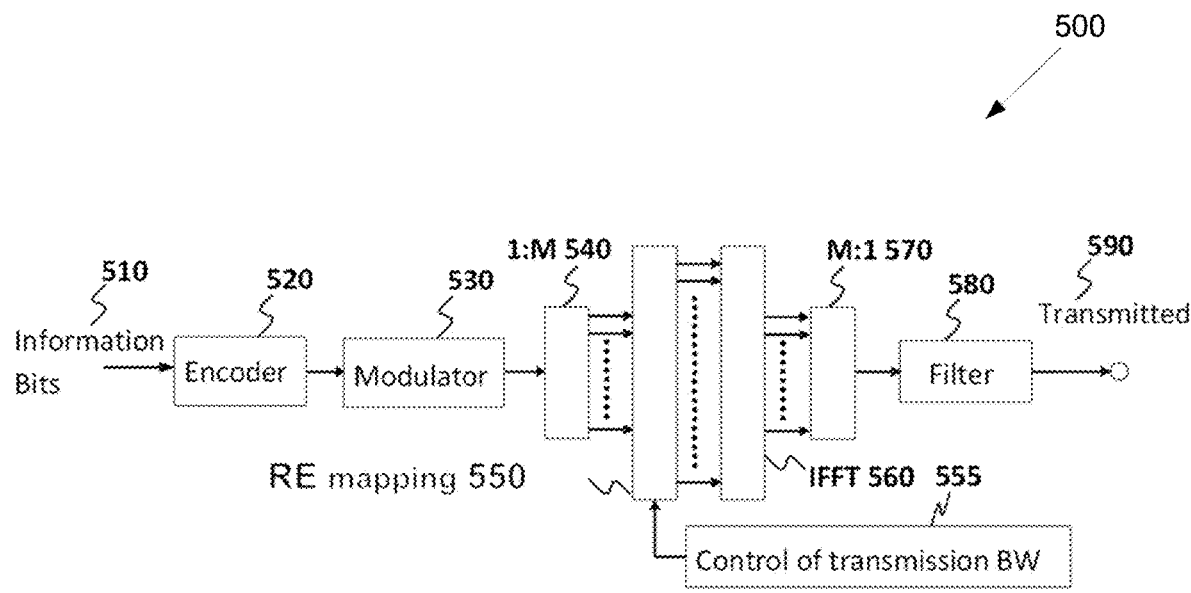
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
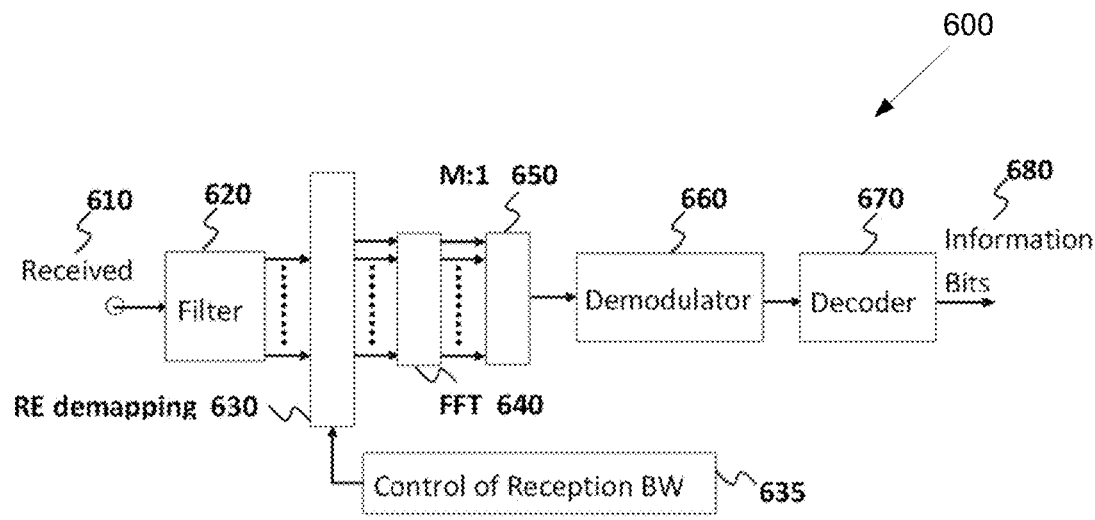
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
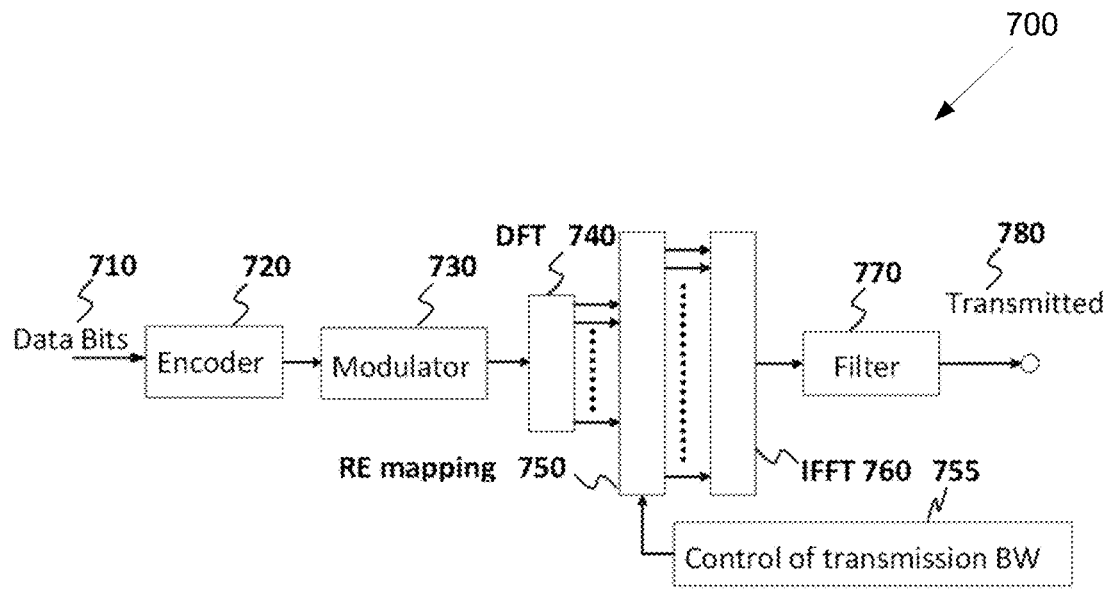
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
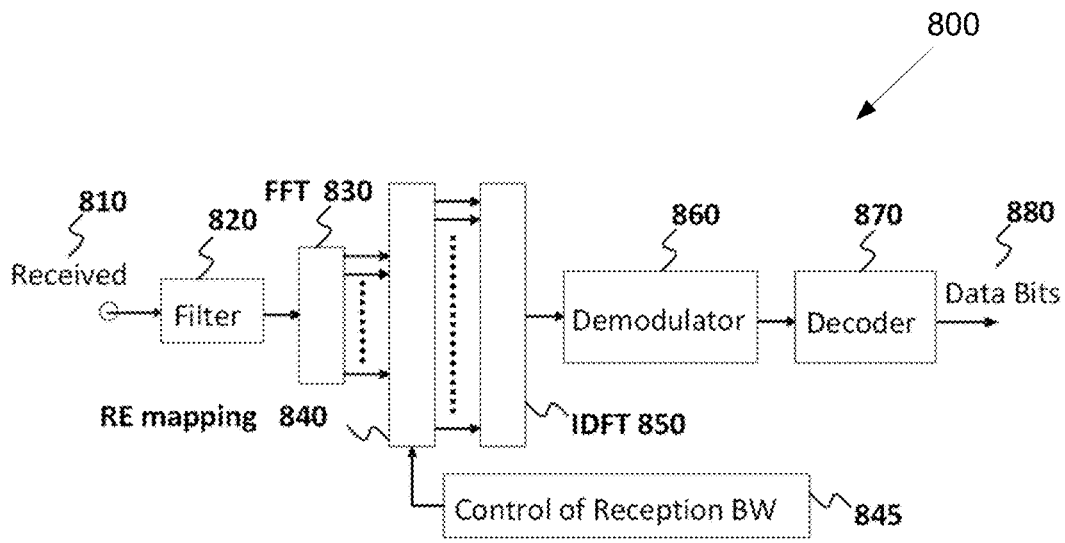
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km' with less stringent the reliability, data rate, and latency requirements.

Figure 9:
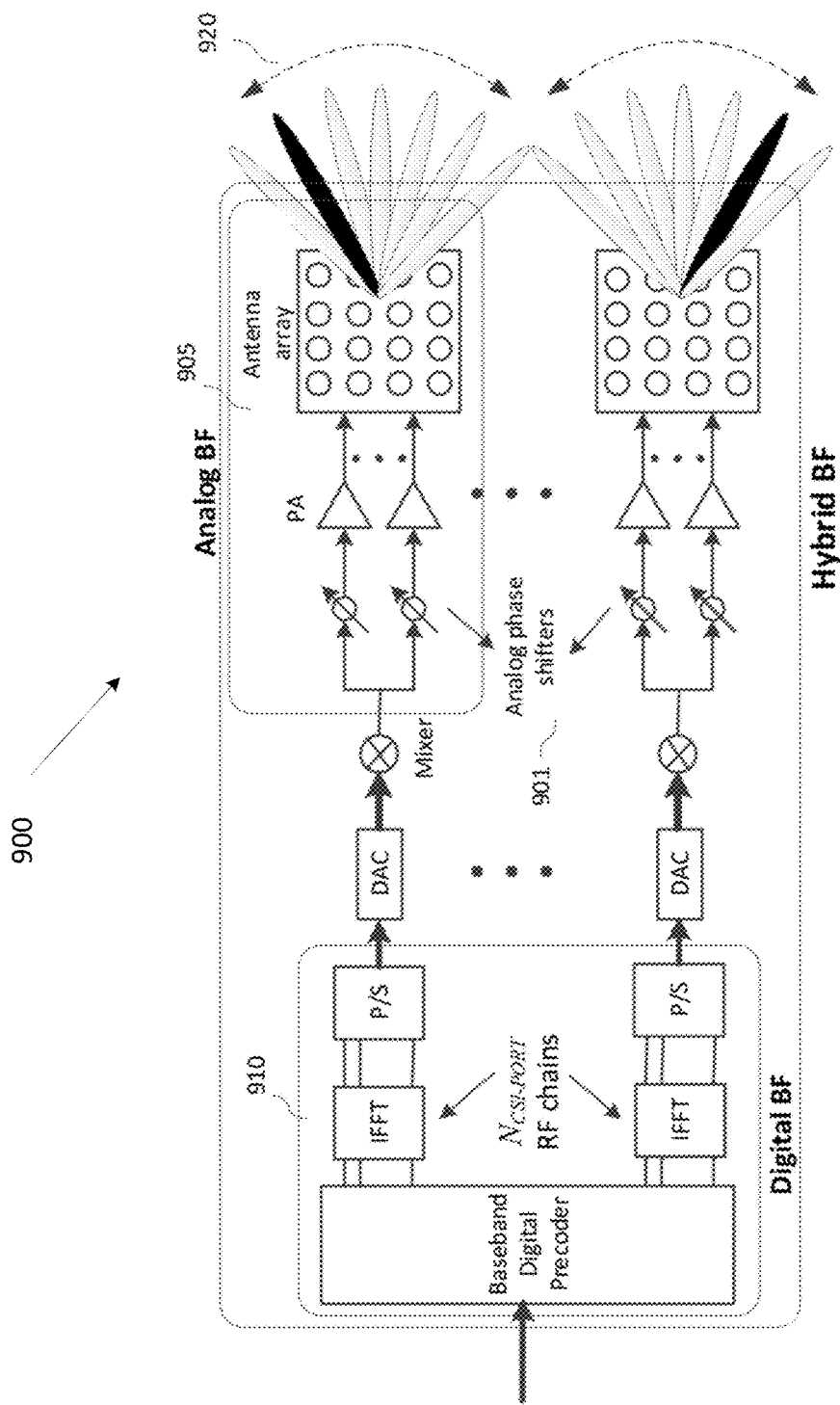
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI\text{-}PORT}$. A digital beamforming unit 910 performs a linear combination across $N_{CSI\text{-}PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanisms corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beam-formed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is 'implicit' in the form of CQI/PMI/RI (also CRI and LI) derived from a codebook assuming SU transmission from eNB (or gNB). Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at eNB (or gNB). For large number of antenna ports, the codebook design for implicit feedback is quite complicated (for example, a total number of 44 Class A codebooks in the 3GPP LTE specification), and the designed codebook is not guaranteed to bring justifiable performance benefits in practical deployment scenarios (for example, only a small percentage gain can be shown at the most). Realizing aforementioned issues, the 3GPP specification also supports advanced CSI reporting in LTE.

In 5G or NR systems [REF7, REF8], the above-mentioned "implicit" CSI reporting paradigm from LTE is also supported and referred to as Type I CSI reporting. In addition, a high-resolution CSI reporting, referred to as Type II CSI reporting, is also supported to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF5), wherein the DFT-based SD basis in $W_1$ is replaced with SD CSI-RS port selection, i.e., L out of $$\frac{P_{CSI-RS}}{2}$$

CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

Figure 10:
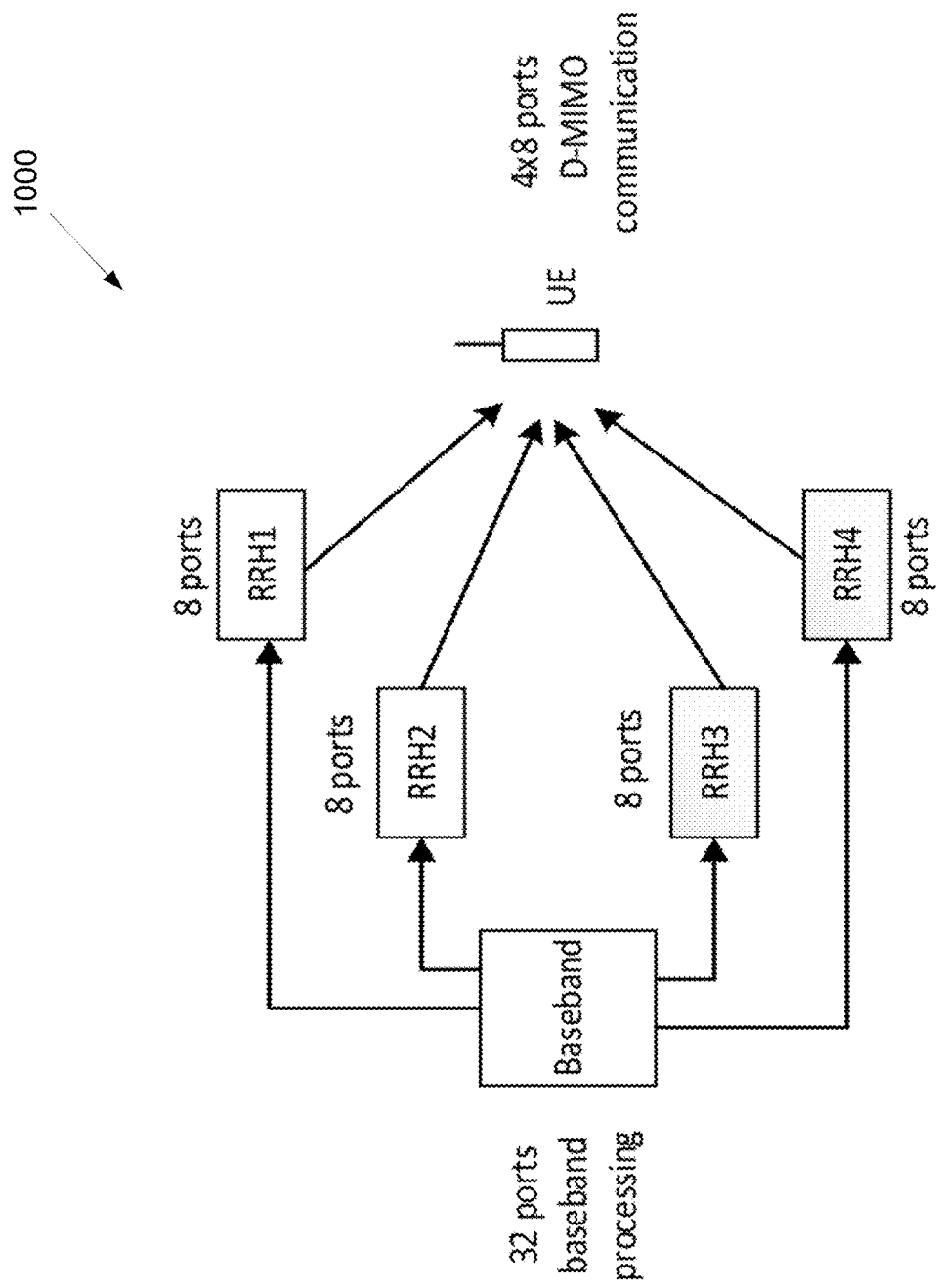
FIG. 10 illustrates an example distributed MIMO (D-MIMO) system according to embodiments of the present disclosure.

FIG. 10 illustrates an example distributed MIMO (D-MIMO) system 1000 according to embodiments of the present disclosure. The embodiment of the distributed MIMO (D-MIMO) system 1000 illustrated in FIG. 10 is for illustration only. FIG. 10 does not limit the scope of this disclosure to any particular implementation of the distributed MIMO (D-MIMO) system 1000.

NR supports up to 32 CSI-RS antenna ports. For a cellular system operating in a sub-1 GHz frequency range (e.g., less than 1 GHz), supporting a large number of CSI-RS antenna ports (e.g., 32) at one site or remote radio head (RRH) is challenging due to larger antenna form factors at these frequencies (when compared with a system operating at a higher frequency such as 2 GHz or 4 GHz). At such low frequencies, the maximum number of CSI-RS antenna ports that can be co-located at a site (or RRH) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple sites (or RRHs). The multiple sites or RRHs can still be connected to a single (common) baseband unit, hence the signal transmitted/received via multiple distributed RRHs can still be processed at a centralized location. For example, 32 CSI-RS ports can be distributed across 4 RRHs, each with 8 antenna ports. Such a MIMO system can be referred to as a distributed MIMO (D-MIMO) system as illustrated in FIG. 10.

The multiple RRHs in a D-MIMO setup can be utilized for spatial multiplexing gain (based on CSI reporting). Since RRHs are geographically separated, they (RRHs) tend to be contribute differently in CSI reporting. This motivates a dynamic RRH selection followed by CSI reporting condition on the RRH selection. This disclosure provides example embodiments on how channel and interference signal can be measure under different RRH selection hypotheses. Additionally, the signaling details of such a CSI reporting and CSI-RS measurement are also provided.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with Mn subbands when one CSI parameter for all the Mn subbands within the CSI reporting band. A CSI parameter is configured with "subband" for the CSI reporting band with Mn subbands when one CSI parameter is reported for each of the Mn subbands within the CSI reporting band.

Figure 11:
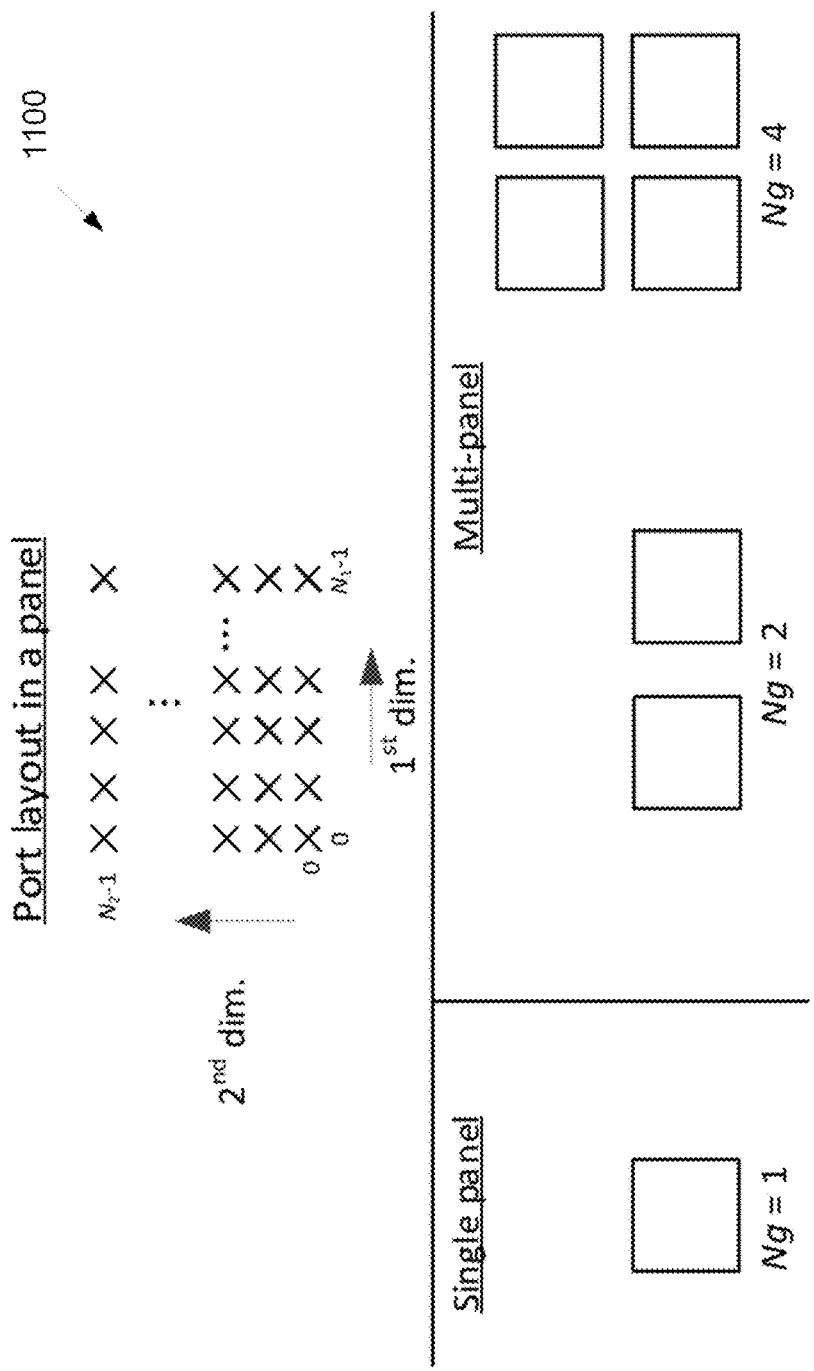
FIG. 11 illustrates an example antenna port layout according to embodiments of the present disclosure.

FIG. 11 illustrates an example antenna port layout 1100 according to embodiments of the present disclosure. The embodiment of the antenna port layout 1100 illustrated in FIG. 11 is for illustration only. FIG. 11 does not limit the scope of this disclosure to any particular implementation of the antenna port layout 1100.

As illustrated in FIG. 11, $N_1$ and $N_2$ are the number of antenna ports with the same polarization in the first and second dimensions, respectively. For 2D antenna port layouts, $N_1>1, N_2>1$, and for 1D antenna port layouts $N_1>1$ and $N_2=1$. Therefore, for a dual-polarized antenna port layout, the total number of antenna ports is $2N_1N_2$ when each antenna maps to an antenna port. An illustration is shown in FIG. 11 where "X" represents two antenna polarizations. In this disclosure, the term "polarization" refers to a group of antenna ports. For example, antenna ports j=X+0, X+1, ..., $$X + \frac{P_{CSIRS}}{2} - 1$$

comprises a first antenna polarization, and antenna ports $$j = X + \frac{P_{CSIRS}}{2}, X + \frac{P_{CSIRS}}{2} + 1,$$

$X+P_{CSIRS}-1$ comprise a second antenna polarization, where $P_{CSIRS}$ is a number of CSI-Rs antenna ports and X is a starting antenna port number (e.g., X=3000, then antenna ports are 3000, 3001, 3002, ... ).

Let $N_g$ be a number of antenna panels at the gNB. When there are multiple antenna panels ($N_g>1$), we assume that each panel is dual-polarized antenna ports with $N_1$ and $N_2$ ports in two dimensions. This is illustrated in FIG. 11. Note that the antenna port layouts may or may not be the same in different antenna panels.

In one example, the antenna architecture of a D-MIMO system is structured. For example, the antenna structure at each RRH is dual-polarized (single or multi-panel as shown in FIG. 11. The antenna structure at each RRH can be the same. Alternatively, the antenna structure at an RRH can be different from another RRH. Likewise, the number of ports at each RRH can be the same. Alternatively, the number of ports of one RRH can be different from another RRH. In one example, $N_g=N_{RRH}$, a number of RRHs in the D-MIMO transmission.

In another example, the antenna architecture of a D-MIMO system is unstructured. For example, the antenna structure at one RRH can be different from another RRH.

We assume a structured antenna architecture in this disclosure. For simplicity, we assume each RRH is equivalent to a panel (cf. FIG. 11), although an RRH can have multiple panels in practice. The disclosure however is not restrictive to a single panel assumption at each RRH, and can easily be extended (covers) the case when an RRH has multiple antenna panels.

When the RRH selection can be performed (i.e., a subset or all of the $N_{RRH}$ RRHs can be selected for the CSI report and subsequently for the DL reception), for example, based on a DL RS (e.g., CSI-RS) measurement by the UE or based on UL RS (e.g., SRS) measurement by the gNB/NW, then a signal received from an RRH is a desired signal if the RRH is selected; otherwise it is an interfering signal. Therefore, the DL RS transmitted from the RRH can be a channel measurement resource (CMR) or an interference measurement resource (IMR) depending on the RRH selection. In this disclosure, example embodiments are provided on the details of configuring such DL RSs depending on the RRH selection mechanisms.

Figure 12:
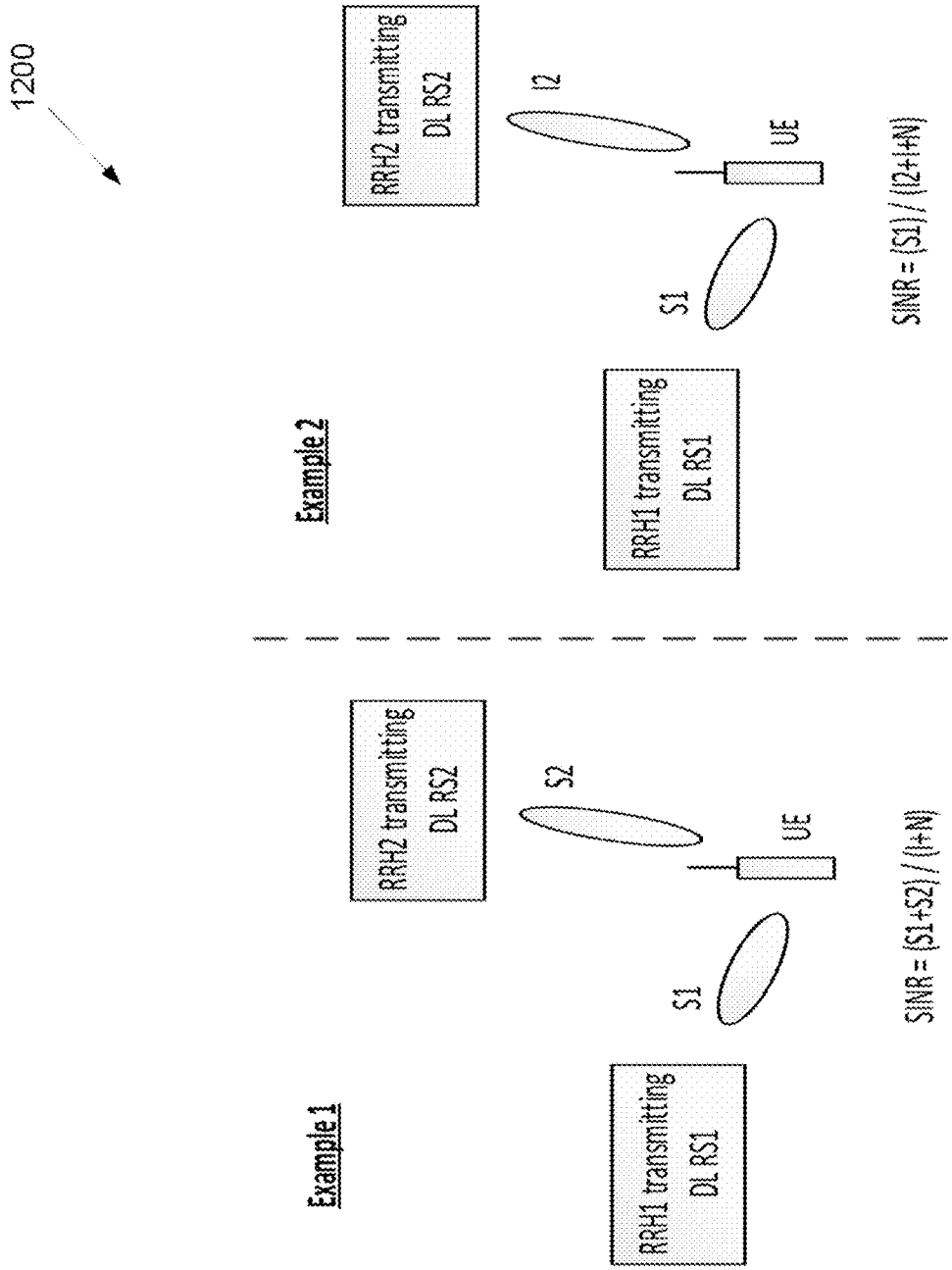
FIG. 12 illustrates an example of inter-RRH interference based on RRH selection according to embodiments of the present disclosure.

FIG. 12 illustrates an example of inter-RRH interference based on RRH selection 1200 according to embodiments of the present disclosure. The embodiment of the inter-RRH interference based on RRH selection 1200 illustrated in FIG. 12 is for illustration only. FIG. 12 does not limit the scope of this disclosure to any particular implementation of the example of inter-RRH interference based on RRH selection 1200.

In one embodiment I.1, a UE is configured with a DL RS (e.g., NZP CSI-RS) that can act either as a CMR or an IMR. For example, an NZP CSI-RS resource transmitted from an RRH can act as a CMR if the corresponding RRH is selected, otherwise it can be treated as an IMR (if the corresponding RRH is not selected). In one example, the selection of an RRH refers to the RRH being selected for DL reception (of PDCCH or/and PDSCH).

The RRH selection can be based on a metric. At least one of the following examples can be used or configured as the metric.

In one example, the metric is a signal-to-interference-plus-noise-ratio (SINR). When an RRH is selected, it contributes to the signal (i.e., numerator) part of the metric, and when the RRH is not selected, it contributes to the interference (denominator) part of the metric.

In one example, the metric is a signal power (i.e., RSRP). For example, an RRH is selected when its signal power is large or larger than a threshold.

In one example, the metric corresponds (maps) to a CQI value included in a CSI report.

Assuming SINR as the metric, the RRH selection is illustrated in FIG. 12, wherein there are two RRHs (RRH1 and RRH2) that transmit DL RSs (DL RS1 and DL RS2). Two examples of the RRH selection are shown. In Example 1, both RRHs are selected, hence both DL RSs act as CMRs, and the SINR value is given by SINR=(S1+S2)/(I+N) where S1 and S2 are desired signal power from RRH1 and RRH2, respectively, and I and N are interference power (e.g., inter-cell interference power) and noise power, respectively. In Example 2, RRH1 is selected, hence DL RS1 acts as an CMR and DL RS2 acts as an IMR, and the SINR value is given by=(S1)/(I2+I+N) where S1 is the desired signal power from RRH1 and I2 is the interference power from RRH2. As illustrated, RRHs acts as a CMR in Example 1 and as an IMR in Example 2. Note that I2 acts as an "inter-RRH interference" in Example 2. Note also that RRH1 and RRH2 are two distributed antenna ports, but they belong to the same cell (hence have the same physical/serving cell-ID).

In one example I.1.1, the RRH selection is performed by the UE and is reported as part of a CSI report (e.g., either via a separate indicator or with exiting indicators such as PMI or CRI), and the CSI report is determined conditioned on the RRH selection. For example, CQI (included in the CSI report) can be calculated conditioned on the RRH selection. Likewise, other CSI parameters such as PMI, RI, or LI can be determined conditioned on the RRH selection. In this case, the UE determines the CSI report considering different hypotheses for the RRH selection. Depending on an RRH selection hypothesis, a DL RS (e.g., NZP CSI-RS) transmitted from an RRH can be treated as a CMR or an IMR in the CSI calculation.

In one example I.1.2, the RRH selection is performed by gNB/NW. For example, a UE can be configured to transmit an SRS resource, and the gNB/NW can measure the SRS resource and use the SRS measurement for the RRH selection (e.g., based on a metric mentioned above). The gNB/NW can then communicate the RRH selection to the UE.

The signaling of the RRH selection from the gNB/NW to the UE can be based on at least one of the following examples.

In one example I.1.2.1, the RRH selection is signaled via a higher layer (RRC) configuration.

In one example I.1.2.1.1, a dedicated (separate) higher layer parameter is used. For example, a DL RS (e.g., NZP CSI-RS) associated with an RRH can be configured similar to Rel. 15 NR, and the role of the DL RS (whether CMR or IMR) as explained in this disclosure can be configured separately. For instance, a dedicated parameter can be included in the CSI reporting setting configuration.

In one example I.1.2.1.2, the configuration is together (joint) with the DL RS (e.g., NZP CSI-RS) configuration such as CSI resource setting in Rel. 15 NR.

In one example I.1.2.2, the RRH selection is indicated based on a MAC CE based activation command. For example, a MAC CE message (such as a bit sequence) can be used for this purpose.

In one example I.1.2.3, the RRH selection is indicated based on dynamic DCI based triggering. For example, code points of a parameter in the DCI can be used to indicate/trigger the RRH selection.

In one example I.1.2.4, the RRH selection is based on a combination of higher layer (RRC) configuration and MAC CE activation.

In one example I.1.2.5, the RRH selection is based on a combination of higher layer (RRC) configuration and DCI based triggering.

In one example I.1.2.6, the RRH selection is based on a combination of MAC CE activation and DCI based triggering.

In one example I.1.2.7, the RRH selection is based on a combination of higher layer (RRC) configuration, MAC CE activation, and DCI based triggering.

In one example I.1.3, the RRH selection is performed based on a combination of both UE-side and gNB/NW-side operations. A two-step RRH selection method can be used. For example, in Step 1, an SRS resource can be transmitted by the UE in order to determine an intermediate RRH set by the gNB/NW, and in Step 2, a DL RS (e.g., NZP CSI-RS) resource can be received by the UE from each RRH, and then the RRH selection can be performed by the UE for the RRHs within the intermediate RRH set. For RRHs not within the intermediate RRH set, the DL RS (NZP CSI-RS) is treated either as CMR only if they are serving RRHs (or IMR only if they are interfering RRHs). The details of Step 1 (including the signaling of the intermediate RRH selection) are analogous to Example I.1.2 and the details of Step 2 are analogous to Example I.1.1.

In one embodiment I.2, the RRH selection can be restricted to be across a subset of RRHs (from $N_{RRH}$ RRHs), where the number or/and the subset of RRHs (from $N_{RRH}$ RRHs) across which the RRH selection is performed is determined according to at least one of the following examples.

In one example I.2.1, both the number of RRHs and the subset of RRHs are fixed, e.g., to $N_{RRH}$.

In one example I.2.2, the number of RRHs is fixed (e.g., to $N_{RRH}/2$), but the subset of RRHs is configured (e.g., via higher layer) or activated via MAC CE command or triggered via DCI.

In one example I.2.3, both the number of RRHs and the subset of RRHs are configured (e.g., via higher layer) or activated via MAC CE command or triggered via DCI.

In one embodiment II.1, a UE is configured with a CSI resource setting (e.g., via higher layer parameter CSI-ResourceConfig) that contains a configuration of a list of S≥1 CSI resource sets (given by higher layer parameter csi-RS-ResourceSetList) where the list is comprised of references to non-zero-power (NZP) CSI-RS resource set(s). There is no explicit association between the NZP CSI-RS resources in the referred NZP CSI-RS resource set(s) and the $N_{RRH}$ RRHs.

In one example II.1.1, S=1, and the list of CSI resource sets refers to a single NZP CSI-RS resource set which includes one NZP CSI-RS resource for each RRH. So, there are $N_{RRH}$ NZP CSI-RS resources included in the NZP CSI-RS resource set. The mapping of NZP CSI-RS resources and RRH indices can be according to at least one of the following examples.

Example II.1.1.1: the mapping is according to a fixed order. For example, a one-on-one mapping can be used wherein an r-th NZP CSI-RS resource in the NZP CSI-RS resource set maps to the r-th RRH.

Example II.1.1.2: the mapping is configured (e.g., via higher layer). For example, an association between NZP CSI-RS resources in the NZP CSI-RS resource set and the RRH indices r=1, . . . , $N_{RRH}$ can be configured.

Note that in this case, the CSI reporting is allowed (or configured) to be across multiple CSI resources (in the CSI resource set) regardless of whether the RRH selection is performed (cf. embodiment I.1) or not (all RRHs are selected for the CSI). In particular, the CSI-RS ports associated with the NZP CSI-RS resources can be aggregated across multiple CSI resources and the PMI (RI/CQI) calculation is based on the aggregated (concatenated) channel measurement.

In one example II.1.2, S=1, and the list of CSI resource sets refers to a single NZP CSI-RS resource set which includes $n_r \geq 1$ NZP CSI-RS resources for r-th RRH where $r=1, \ldots, N_{RRH}$. So, there are $\Sigma_{r=1}^{N_{RRH}} n_r$ NZP CSI-RS resources included in the NZP CSI-RS resource set. In one example, the NZP CSI resource set is divided into $N_{RRH}$ subsets, where r-th subset is associated with r-th RRH and comprises $n_r$ NZP CSI-RS resources. In one example, $n_r=n$ for all r. In one example, $n_r$ can be different across RRHs. The value n or the set of values $\{n_r\}$ can be fixed, or configured (e.g., via higher layer). The mapping of NZP CSI-RS resource subsets and RRH indices can be according to at least one of the following examples.

Example II.1.2.1: the mapping is according to a fixed order. For example, a one-on-one mapping can be used wherein the first $n_1$ NZP CSI-RS resources in the NZP CSI-RS resource set map to the first RRH (r=1), the $(n_1+1)$-th through $(n_1+n_2)$-th NZP CSI-RS resources in the NZP CSI-RS resource set map to the second RRH (r=1), and so on.

Example II.1.2.2: the mapping is configured (e.g., via higher layer). For example, an association between NZP CSI-RS resource subsets in the NZP CSI-RS resource set and the RRH indices $r=1, \ldots, N_{RRH}$ can be configured.

Note that in this case, the CSI reporting is allowed (or configured) to be across multiple CSI resources (one from each subset corresponding to an RRH) regardless of whether the RRH selection is performed (cf. embodiment I.1) or not (all RRHs are selected for the CSI). In particular, the CSI-RS ports associated with the NZP CSI-RS resources (one from each subset corresponding to an RRH) can be aggregated across multiple CSI resources (one from each subset corresponding to an RRH) and the PMI (RI/CQI) calculation is based on the aggregated (concatenated) channel measurement.

In one example II.1.3, $S=N_{RRH}$, and the list of CSI resource sets refers to $N_{RRH}$ NZP CSI-RS resource sets, one for each RRH. The r-th NZP CSI resource set includes NZP CSI-RS resource(s) associated with the r-th RRH. The mapping of NZP CSI-RS resource sets and RRH indices can be according to at least one of the following examples.

Example II.1.3.1: the mapping is according to a fixed order. For example, a one-on-one mapping can be used wherein an r-th NZP CSI-RS resource set in the list of NZP CSI-RS resource sets maps to the r-th RRH.

Example II.1.3.2: the mapping is configured (e.g., via higher layer). For example, an association between NZP CSI-RS resource sets in the list of NZP CSI-RS resource sets and the RRH indices $r=1, \ldots, N_{RRH}$ can be configured.

Note that in this case, the CSI reporting is allowed (or configured) to be across multiple CSI resource sets regardless of whether the RRH selection is performed (cf. embodiment I.1) or not (all RRHs are selected for the CSI). In particular, the CSI-RS ports associated with the NZP CSI-RS resources (one from each CSI resource set corresponding to an RRH) can be aggregated across multiple CSI resources and the PMI (RI/CQI) calculation is based on the aggregated (concatenated) channel measurement.

In one example II.1.4, $S \geq N_{RRH}$, and the list of CSI resource sets refers to $m_r$ NZP CSI-RS resource sets for r-th RRH where $r=1, \ldots, N_{RRH}$. So, $S=\Sigma_{r=1}^{N_{RRH}} m_r$, and the set of S NZP CSI resource sets is divided into $N_{RRH}$ subsets, where r-th subset is associated with r-th RRH and comprises $m_r$ NZP CSI-RS resource sets. In one example, $m_r=m$ for all r. In one example, $m_r$ can be different across RRHs. The value m or the set of values $\{m_r\}$ can be fixed, or configured (e.g., via higher layer). The mapping of NZP CSI-RS resource sets and RRH indices can be according to at least one of the following examples.

Example II.1.4.1: the mapping is according to a fixed order. For example, a one-on-one mapping can be used wherein the first $n_1$ NZP CSI-RS resource sets in the list of NZP CSI-RS resource sets map to the first RRH (r=1), the $(n_1+1)$-th through $(n_1+n_2)$-th NZP CSI-RS resource sets in the list of NZP CSI-RS resource sets map to the second RRH (r=1), and so on.

Example II.1.4.2: the mapping is configured (e.g., via higher layer). For example, an association between NZP CSI-RS resource sets in the list of NZP CSI-RS resource sets and the RRH indices $r=1, \ldots, N_{RRH}$ can be configured.

Note that in this case, the CSI reporting is allowed (or configured) to be across multiple CSI resource sets (one from each subset of CSI resource sets corresponding to an RRH) regardless of whether the RRH selection is performed (cf. embodiment I.1) or not (all RRHs are selected for the CSI). In particular, the CSI-RS ports associated with the NZP CSI-RS resources (one from each subset of CSI resource sets corresponding to an RRH) can be aggregated across multiple CSI resources (one from each subset of CSI resource sets corresponding to an RRH) and the PMI (RI/CQI) calculation is based on the aggregated (concatenated) channel measurement.

In one embodiment II.2, a UE is configured with $M=N_{RRH}$ CSI resource settings (e.g., via higher layer parameter CSI-ResourceConfig), one CSI resource setting for each RRH. Each CSI resource setting contains a configuration of a list of $S \geq 1$ CSI resource sets (given by higher layer parameter csi-RS-ResourceSetList) where the list is comprised of references to non-zero-power (NZP) CSI-RS resource set(s). There details of the CSI resource setting are as explained in embodiment II.1. Note that in this case, the CSI reporting is allowed (or configured) to be across multiple CSI resource settings regardless of whether the RRH selection is performed (cf. embodiment I.1) or not (all RRHs are selected for the CSI). In particular, the CSI-RS ports associated with the NZP CSI-RS resources can be aggregated across multiple CSI resource settings and the PMI (RI/CQI) calculation is based on the aggregated (concatenated) channel measurement.

In one example, the information element (IE) configuring a CSI resource setting as explained above is according to Rel. 15 NR [REF5], which is copied below. The relevant parameters in the IE are underlined.

The IE CSI-ResourceConfig defines a group of one or more NZP-CSI-RS-ResourceSet, CSI-IM-ResourceSet and/or CSI-SSB-ResourceSet.

```
-- ASN1START
-- TAG-CSI-RESOURCECONFIG-START
CSI-ResourceConfig ::=            SEQUENCE {
    csi-ResourceConfigId          ,
    csi-RS-ResourceSetList        CHOICE {
```

```
    nzp-CSI-RS-SSB                  SEQUENCE {
        nzp-CSI-RS-ResourceSetList SEQUENCE (SIZE (1..maxNrofNZP-CSI-RS-ResourceSetsPerConfig)) OF
NZP-CSI-RS-ResourceSetId
                                            OPTIONAL, -- Need R
        csi-SSB-ResourceSetList             SEQUENCE (SIZE (1..maxNrofCSI-SSB-ResourceSetsPerConfig)) OF CSI-
SSB-ResourceSetId OPTIONAL -- Need R
    },
    csi-IM-ResourceSetList              SEQUENCE (SIZE (1..maxNrofCSI-IM-ResourceSetsPerConfig)) OF CSI-IM-
ResourceSetId
    },
    bwp-Id                  BWP-Id,
    resourceType            ENUMERATED { aperiodic, semiPersistent, periodic },
    ...
}
-- TAG-CSI-RESOURCECONFIG-STOP
-- ASN1STOP
```

The IE NZP-CSI-RS-ResourceSet is a set of Non-Zero-Power (NZP) CSI-RS resources (their IDs) and set-specific parameters.

```
-- ASN1START
-- TAG-NZP-CSI-RS-RESOURCESET-START
NZP-CSI-RS-ResourceSet ::=          SEQUENCE {
    nzp-CSI-ResourceSetId           NZP-CSI-RS-ResourceSetId,
    nzp-CSI-RS-Resources            SEQUENCE (SIZE (1..maxNrofNZP-CSI-RS-ResourcesPerSet)) OF NZP-
CSI-RS-ResourceId,
    repetition              ENUMERATED { on, off }       OPTIONAL, -- Need S
    aperiodicTriggeringOffset       INTEGER(0..6)                  OPTIONAL, -- Need S
    trs-Info                ENUMERATED {true}            OPTIONAL, -- Need R
    ...,
    [[
    aperiodicTriggeringOffset-r16           INTEGER(0..31)         OPTIONAL -- Need S
    ]]
}
-- TAG-NZP-CSI-RS-RESOURCESET-STOP
-- ASN1STOP
```

The IE NZP-CSI-RS-Resource is used to configure Non-Zero-Power (NZP) CSI-RS transmitted in the cell where the IE is included, which the UE may be configured to measure on.

```
-- ASN1START
-- TAG-NZP-CSI-RS-RESOURCE-START
NZP-CSI-RS-Resource ::=     SEQUENCE {
    nzp-CSI-RS-ResourceId       ,
    resourceMapping         CSI-RS-ResourceMapping,
    powerControlOffset      INTEGER (-8..15),
    powerControlOffsetSS        ENUMERATED{db-3, db0, db3, db6}    OPTIONAL, -- Need R
    scramblingID        ,
    periodicityAndOffset            CSI-ResourcePeriodicityAndOffset    OPTIONAL, -- Cond
PeriodicOrSemiPersistent
    qcl-InfoPeriodicCSI-RS      TCI-StateId                 OPTIONAL, -- Cond Periodic
    ...
}
-- TAG-NZP-CSI-RS-RESOURCE-STOP
-- ASN1STOP
```

The IE CSI-RS-ResourceMapping is used to configure the resource element mapping of a CSI-RS resource in time- and frequency domain.

```
-- ASN1START
-- TAG-CSI-RS-RESOURCEMAPPING-START
CSI-RS-ResourceMapping ::=              SEQUENCE {
    frequencyDomainAllocation           CHOICE {
        row1                BIT STRING (SIZE (4)),
        row2                BIT STRING (SIZE (12)),
```

```
    row4                    BIT STRING (SIZE (3)),
    other                   BIT STRING (SIZE (6))
  },
  nrofPorts                 ENUMERATED {p1,p2,p4,p8,p12,p16,p24,p32},
  firstOFDMSymbolInTimeDomain      INTEGER (0..13),
  firstOFDMSymbolInTimeDomain2     INTEGER (2..12)          OPTIONAL, --
    Need R
  cdm-Type                  ENUMERATED {noCDM, fd-CDM2, cdm4-FD2-TD2, cdm8-FD2-TD4},
  density                   CHOICE {
    dot5                    ENUMERATED {evenPRBs, oddPRBs},
    one                     NULL,
    three                   NULL,
    spare                   NULL
  },
  freqBand                  CSI-FrequencyOccupation,
  ...
}
-- TAG-CSI-RS-RESOURCEMAPPING-STOP
-- ASN1STOP
```

In one embodiment II.3, for CSI reporting, a UE is configured with a CSI reporting setting (e.g., via higher layer parameter CSI-ReportConfig) in addition to the CSI resource setting (cf. embodiment II.1 and II.2). The CSI reporting setting includes the parameters for the CSI reporting, where the parameters include CSI resource set(s) for channel and interference measurement. For the case of $N_{RRH}>1$ RRHs, when dynamic RRH selection (as explained above) is performed and the details of the CSI resource setting are as explained in embodiment II.1/II.2, at least one of the following examples can be used/configured for configuring the parameter for the channel measurement.

In one example II.3.1, a UE is configured with a CSI resource setting (e.g., via higher layer parameter CSI-ReportConfig) that includes a parameter resourcesForChannelOrinterference that refers to a CSI resource setting, wherein the details of the CSI resource setting are as explained in embodiment II.1/II.2.

| resourcesForChannelOrInterference | CSI-ResourceConfigId, |
|---|---|

This parameter refers to a single CSI resource setting that includes a list of NZP CSI-RS resource set(s). The NZP CSI-RS resources in each NZP CSI-RS resource set can be a CMR or an IMR (cf. embodiment I.1).

In one example II.3.2, a UE is configured with a CSI resource setting (e.g., via higher layer parameter CSI-ReportConfig) that includes a parameter resourcesForChannelOrinterference that refers to a CSI resource setting, wherein the details of the CSI resource setting are as explained in embodiment II.1/II.2.

| resourcesForChannelOrInterference | SEQUENCE (SIZE (1 . . . NRRH)) OF CSI-ResourceConfigId, |
|---|---|

The parameter refers to up to $N_{RRH}$ CSI resource settings, one CSI resource setting for each RRH that includes a list of NZP CSI-RS resource set(s) for the particular RRH. The NZP CSI-RS resources in each NZP CSI-RS resource set can be a CMR or an IMR (cf. embodiment I.1).

In one example II.3.3, a UE is configured with a CSI resource setting (e.g., via higher layer parameter CSI-ReportConfig) that includes a parameter resourcesForChannelOrinterference and a parameter resourcesForChannelMeasurement that refer to two CSI resource settings, wherein the details of the CSI resource setting are as explained in embodiment II.1/II.2.

| resourcesForChannelMeasurement | CSI-ResourceConfigId, |
|---|---|
| resourcesForChannelOrInterference | CSI-ResourceConfigId, |

The parameter resourcesForChannelOrinterference refers to a single CSI resource setting that includes a list of NZP CSI-RS resource set(s) for a subset of RRHs across which RRH selection can be performed (cf. embodiment II.1), i.e., the NZP CSI-RS resources in each NZP CSI-RS resource set in this resource setting can be a CMR or an IMR (cf. embodiment I.1). The parameter resourcesForChannelMeasurement refers to a single CSI resource setting that includes a list of NZP CSI-RS resource set(s) for another subset of RRHs across which RRH selection can't be performed, i.e., the NZP CSI-RS resources in each NZP CSI-RS resource set in this resource setting can be a CMR only.

In one example II.3.4, a UE is configured with a CSI resource setting (e.g., via higher layer parameter CSI-ReportConfig) that includes a parameter resourcesForChannelOrinterference and a parameter resourcesForChannelMeasurement that refer to two CSI resource settings, wherein the details of the CSI resource setting are as explained in embodiment II.1/II.2.

| resourcesForChannelMeasurement | SEQUENCE (SIZE (1 . . . X1)) OF CSI-ResourceConfigId, |
|---|---|
| resourcesForChannelOrInterference | SEQUENCE (SIZE (1 . . . X2)) OF CSI-ResourceConfigId, |

The parameter resourcesForChannelOrinterference refers to up to X2 CSI resource settings, one CSI resource setting for each RRH that includes a list of NZP CSI-RS resource set(s) for the particular RRH in a subset of RRHs across which RRH selection can be performed (cf. embodiment II.1), i.e., the NZP CSI-RS resources in each NZP CSI-RS resource set in this resource setting can be a CMR or an IMR (cf. embodiment I.1). The parameter resourcesForChannelMeasurement refers to up to X2 CSI resource settings, one CSI resource setting for each RRH that includes a list of NZP CSI-RS resource set(s) for another subset of RRHs across which RRH selection can't be performed, i.e., the NZP CSI-RS resources in each NZP CSI-RS resource set in this resource setting can be a CMR only.

In one embodiment II.4, when $N_{RRH}>1$ and when each RRH is associated with a NZP CSI-RS resource (or resource set), the parameters of the NZP CSI-RS resource (e.g., frequencyDomainAllocation, nrofPorts, firstOFDMSymbolInTimeDomain, cdm-Type, density, freqBand) can be determined/configured according to at least one of the following examples.

In one example II.4.1, all parameters of the NZP CSI-RS resource are the same across all RRHs (for a uniform RRH setup/configuration).

In one example II.4.2, a subset of the parameters of the NZP CSI-RS resource are the same across all RRHs, and the remaining parameters can be different across all RRHs.

In one example II.4.2.1, the number of CSI-RS ports (parameter nrofPorts) can be different, and the remaining parameters are the same.

In one example II.4.2.2, the frequency band (parameter-freqBand) is the same, and the remaining parameters can be different.

In one example II.4.3, any parameter of the NZP CSI-RS resource can be different across all RRHs.

In one example II.4.4, whether a parameter of the NZP CSI-RS resource is the same or can be different across all RRHs is configured via RRH or activated via MAC CE or triggered via DCI. In one example, such a configuration is for any parameter of the NZP CSI-RS resource. In another example, such a configuration is only for a subset of parameters, for example, only for nrofPorts (number of CSI-RS ports).

In one example II.4.5, when the number of CSI-RS ports (parameter nrofPorts) is the same across RRHs, then all parameters of the NZP CSI-RS resource are the same across all RRHs; and when the number of CSI-RS ports (parameter nrofPorts) can be different across RRHs, then all parameters of the NZP CSI-RS resource can be different across all RRHs.

In one embodiment II.5, a UE is configured with a CSI reporting based on an explicit RRH identifier (e.g., RRH-ID) or a list of RRH-IDs. At least one of the following examples can be used/configured.

In one example II.5.1, the UE is configured with a CSI resource setting (e.g., via higher layer parameter CSI-ResourceConfig) that includes an RRH-ID that is associated with the list of S≥1 CSI resource sets, or one RRH-ID for each CSI-resource set in the list of CSI resource sets (i.e., S RRH-IDs in total).

In one example II.5.1.1, S=$N_{RRH}$ and an RRH-ID is associated with each CSI resource set.

In one example II.5.1.2, S>$N_{RRH}$ and there are $m_r$ NZP CSI-RS resource sets for r-th RRH, and an RRH-ID is associated with each subset of $n_y$ NZP CSI-RS resource sets.

In one example II.5.2, the UE is configured with a CSI resource setting (e.g., via higher layer parameter CSI-ResourceConfig) that includes S=1 CSI resource set that in turn includes an indication about NZP CSI-RS resources for the RRHs.

In one example II.5.2.1, there are one NZP CSI-RS resource for each RRH, and an RRH-ID is associated with each NZP CSI-RS resource in the CSI resource set.

In one example II.5.2.2, there are $n_r$ NZP CSI-RS resources for r-th RRH, and an RRH-ID is associated with each subset of $n_r$ NZP CSI-RS resources.

In one example II.5.3, the UE is configured with a CSI report setting that includes an indication about RRH-ID or a list of RRH-IDs. Such an ID or the list of IDs can convey some information about the set or subset of RRHs (cf. RRH selection) that the CSI reporting corresponds to. Alternatively, it can also communicate the information about the NZP CSI-RS resources (or resource sets) that are associated with different RRHs and are used for CSI reporting. The details about the CSI reporting can be according to some embodiments of this disclosure (including the role of NZP CSI-RSs being a CMR or an IMR dynamically).

In one embodiment III.1, a UE is configured with a CSI reporting setting (e.g. via higher layer parameter CSI-ReportConfig) and one CSI resource setting (e.g. via higher layer parameter CSI-ResourceConfig), where
  the CSI reporting setting configures $N_{RRH}$ CSI reports, one for each RRH, and
  the CSI resource setting configures one CSI-RS resource (example II.1.1) or at least one CSI-RS resources (example II.1.2) or one CSI-RS resource set (example II.1.3) or at least one CSI-RS resource sets (example II.1.4) for each RRH.

The details of the CSI resource settings are according to at least one example in embodiment II.1. The CSI reporting setting and the CSI resource setting are linked together (e.g. via RRC configuration) for a CSI reporting for a DMIMO system comprising $N_{RRH}$ RRHs.

In addition, for each RRH r=1, . . . , $N_{RRH}$, the UE is further configured with a codebook $C_r$ of $P_r$ CSI-RS ports. (e.g. via one higher layer parameter codebookType or via $N_{RRH}$ higher layer parameter, one for each RRH). In this case, the UE, rather than using one large codebook for $\Sigma_{r=1}^{N_{RRH}} P_r$ CSI-RS ports, is configured to use $N_{RRH}$ codebooks, each for $P_r$ CSI-RS ports. In one example, codebookType is the same for all RRHs, hence only codebook needs to be configured that is the same for all RRHs. In one example, codebookType can be the same or different across all RRHs, hence $N_{RRH}$ codebooks need to be configured that can be the same or different across all RRHs. In one example, $P_r$=p implying the same number of CSI-RS ports for all RRHs. In one example, $P_r$ can be different across RRHs.

In a variation (embodiment III.1.A), the CSI resource setting configures one or at least one CSI-RS resource comprising P=$\Sigma_{r=1}^{N_{RRH}} P_r$ CSI-RS ports, which can be partitioned into $N_{RRH}$ port groups $g_1$, . . . , $g_{N_{RRH}}$, the port group $g_r$ is associated with r-th RRH and comprises $P_r$ CSI-RS ports. In one example, the CSI-RS ports 0, 1, . . . , $P_1-1$ comprises the port group $g_1$, the CSI-RS ports $P_1$, $P_1+1$, . . . , $P_1+P_2-1$ comprises the port group $g_2$, and so on. In general, the CSI-RS ports $\Sigma_{t=1}^{r-1} P_t$, $\Sigma_{t=1}^{r-1} P_t+1$, . . . , $\Sigma_{t=1}^{r} P_t-1$ comprises the port group $g_r$, where $\Sigma_{t=1}^{-1} P_t=0$. The CSI reporting setting is the same as in embodiment III.1. In this case, the UE is configured with one codebook for $\Sigma_{r=1}^{N_{RRH}} P_r$ CSI-RS ports. Or, the UE is configured with one codebook for $P_r$=p ports (when the same number of CSI-RS ports for all RRHs). Or, the UE is configured with $N_{RRH}$ codebooks, each for $P_r$ CSI-RS ports (when different number of CSI-RS ports across all RRHs).

In a variation (embodiment III.1.B), the CSI resource setting configures one or at least one CSI-RS resource set comprising CSI-RS resource(s), each CSI-RS resource comprises P=$\Sigma_{r=1}^{N_{RRH}} P_r$ CSI-RS ports, which can be partitioned into $N_{RRH}$ port groups $g_1, \ldots g_{N_{RRH}}$, the port group $g_r$ is associated with r-th RRH and comprises $P_r$ CSI-RS ports. In one example, the CSI-RS ports $0, 1, \ldots, P_1-1$ comprises the port group $g_1$, the CSI-RS ports $P_1, P_1+1, \ldots, P_1+P_2-1$ comprises the port group $g_2$, and so on. In general, the CSI-RS ports $\Sigma_{t=1}^{r-1} P_t, \Sigma_{t=1}^{r-1} P_t+1, \ldots, \Sigma_{t=1}^{r} P_t-1$ comprises the port group $g_2$, where $\Sigma_{t=1}^{-1} P_t$=0. The CSI reporting setting is the same as in embodiment III.1. In this case, the UE is configured with one codebook for $\Sigma_{r=1}^{N_{RRH}} P_r$ CSI-RS ports. Or, the UE is configured with one codebook for $P_r$=p ports (when the same number of CSI-RS ports for all RRHs). Or, the UE is configured with $N_{RRH}$ codebooks, each for $P_r$ CSI-RS ports (when different number of CSI-RS ports across all RRHs).

In a variation (embodiment III.1.C), the CSI resource setting and the codebook are the same as in embodiment III.1.A. The CSI reporting setting configures a CSI report comprising $N_{RRH}$ components, one component for each RRH. Each component comprises content(s) of the CSI report associated with an RRH. In one example, each component corresponds to intra-RRH components associated with an RRH.

In a variation (embodiment III.1.D), the CSI resource setting and the codebook are the same as in embodiment III.1.B. The CSI reporting setting configures a CSI report comprising $N_{RRH}$ components, one component for each RRH. Each component comprises content(s) of the CSI report associated with an RRH. In one example, each component corresponds to intra-RRH components associated with an RRH.

In one embodiment III.2, a UE is configured with a CSI reporting setting (e.g. via higher layer parameter CSI-ReportConfig) and $N_{RRH}$ CSI resource settings (e.g. via one higher layer parameter CSI-ResourceConfig or via $N_{RRH}$ higher layer parameters, one for each RRH), where
  the CSI reporting setting configures $N_{RRH}$ CSI reports, one for each RRH, and
  each of the $N_{RRH}$ CSI resource settings configures one or more than one CSI-RS resources or resource sets for an RRH.

The details of the CSI resource settings are according to at least one example in embodiment II.2. The CSI reporting setting and the $N_{RRH}$ CSI resource settings are linked together (e.g. via RRC configuration) for a CSI reporting for a DMIMO system comprising $N_{RRH}$ RRHs.

In addition, for each RRH r=1, ..., $N_{RRH}$, the UE is further configured with a codebook $C_r$ of $P_r$ CSI-RS ports. (e.g. via one higher layer parameter codebookType or via $N_{RRH}$ higher layer parameter, one for each RRH). In this case, the UE, rather than using one large codebook of $\Sigma_{r=1}^{N_{RRH}} P_r$ CSI-RS ports, is configured to use $N_{RRH}$ codebooks, each of $P_r$ CSI-RS ports. In one example, codebookType is the same for all RRHs, hence only codebook needs to be configured that is the same for all RRHs. In one example, codebookType can be the same or different across all RRHs, hence $N_{RRH}$ codebooks need to be configured that can be the same or different across all RRHs. In one example, $P_r$=p implying the same number of CSI-RS ports for all RRHs. In one example, $P_r$ can be different across RRHs.

Alternatively, the UE is configured with one codebook for $\Sigma_{r=1}^{N_{RRH}} P_r$ CSI-RS ports (across multiple CSI resources or resource sets). Or, the UE is configured with one codebook for $P_r$=p ports (when the same number of CSI-RS ports for all RRHs). Or, the UE is configured with $N_{RRH}$ codebooks, each for $P_r$ CSI-RS ports (when different number of CSI-RS ports across all RRHs).

In a variation (embodiment III.2.A), the CSI resource setting and the codebook are the same as in embodiment III.2. The CSI reporting setting configures a CSI report comprising $N_{RRH}$ components, one component for each RRH. Each component comprises content(s) of the CSI report associated with an RRH. In one example, each component corresponds to intra-RRH components associated with an RRH.

In one embodiment III.3, a UE is configured with $N_{RRH}$ CSI reporting settings (e.g. via one higher layer parameter CSI-ReportConfig or via $N_{RRH}$ higher layer parameters, one for each RRH) and one CSI resource setting (e.g. via higher layer parameter CSI-ResourceConfig), where
  each of the $N_{RRH}$ CSI reporting settings configures a CSI reporting for an RRH, and
  the CSI resource setting configures one CSI-RS resource (example II.1.1) or at least one CSI-RS resources (example II.1.2) or one CSI-RS resource set (example II.1.3) or at least one CSI-RS resource sets (example II.1.4) for each RRH.

The details of the CSI resource settings are according to at least one example in embodiment II.1. The $N_{RRH}$ CSI reporting settings and the CSI resource setting are linked together (e.g. via RRC configuration) for a CSI reporting for a DMIMO system comprising $N_{RRH}$ RRHs.

In addition, for each RRH r=1, ..., $N_{RRH}$, the UE is further configured with a codebook $C_r$ of $P_r$ CSI-RS ports. (e.g. via one higher layer parameter codebookType or via $N_{RRH}$ higher layer parameter, one for each RRH). In this case, the UE, rather than using one large codebook of $\Sigma_{r=1}^{N_{RRH}} P_r$ CSI-RS ports, is configured to use $N_{RRH}$ codebooks, each of $P_r$ CSI-RS ports. In one example, codebookType is the same for all RRHs, hence only codebook needs to be configured that is the same for all RRHs. In one example, codebookType can be the same or different across all RRHs, hence $N_{RRH}$ codebooks need to be configured that can be the same or different across all RRHs. In one example, $P_r$=p implying the same number of CSI-RS ports for all RRHs. In one example, $P_r$ can be different across RRHs.

In a variation (embodiment CSI resource setting configures one or at least one CSI-RS resource comprising P=$\Sigma_{r=1}^{N_{RRH}} P_r$ CSI-RS ports, which can be partitioned into $N_{RRH}$ port groups $g_1, \ldots, g_{N_{RRH}}$, the port group $g_r$ is associated with r-th RRH and comprises $P_r$ CSI-RS ports. In one example, the CSI-RS ports $0, 1, \ldots, P_1-1$ comprises the port group $g_1$, the CSI-RS ports $P_1, P_1+1, \ldots, P_1+P_2-1$ comprises the port group $g_2$, and so on. In general, the CSI-RS ports $\Sigma_{t=1}^{r-1} P_t, \Sigma_{t=1}^{r-1} P_t+1, \ldots, \Sigma_{t=1}^{r} P_t-1$ comprises the port group $g_2$, where $\Sigma_{t=1}^{-1} P_t$=0. The CSI reporting setting is the same as in embodiment III.3. In this case, the UE is configured with one codebook for $\Sigma_{r=1}^{N_{RRH}} P_r$ CSI-RS ports. Or, the UE is configured with one codebook for $P_r$=p ports (when the same number of CSI-RS ports for all RRHs). Or, the UE is configured with $N_{RRH}$ codebooks, each for $P_r$ CSI-RS ports (when different number of CSI-RS ports across all RRHs).

In a variation (embodiment III.3.B), the CSI resource setting configures one or at least one CSI-RS resource set comprising CSI-RS resource(s), each CSI-RS resource comprises $P=\Sigma_{r=1}^{N_{RRH}} P_r$ CSI-RS ports, which can be partitioned into $N_{RRH}$ port groups $g_1, \ldots g_{N_{RRH}}$, the port group $g_r$ is associated with r-th RRH and comprises $P_r$ CSI-RS ports. In one example, the CSI-RS ports $0, 1, \ldots, P_1-1$ comprises the port group $g_1$, the CSI-RS ports $P_1, P_1+1, \ldots, P_1+P_2-1$ comprises the port group $g_2$, and so on. In general, the CSI-RS ports $\Sigma_{t=1}^{r-1} P_t, \Sigma_{t=1}^{r-1} P_t+1, \ldots, \Sigma_{t=1}^{r} P_t-1$ comprises the port group $g_2$, where $\Sigma_{t=1}^{-1} P_t=0$. The CSI reporting setting is the same as in embodiment III.3. In this case, the UE is configured with one codebook for $\Sigma_{r=1}^{N_{RRH}} P_r$ CSI-RS ports. Or, the UE is configured with one codebook for $P_r=p$ ports (when the same number of CSI-RS ports for all RRHs). Or, the UE is configured with $N_{RRH}$ codebooks, each for $P_r$ CSI-RS ports (when different number of CSI-RS ports across all RRHs).

In one embodiment III.4, a UE is configured with $N_{RRH}$ CSI reporting settings (e.g. via one higher layer parameter CSI-ReportConfig or via $N_{RRH}$ higher layer parameters, one for each RRH) and $N_{RRH}$ CSI resource settings (e.g. via one higher layer parameters CSI-ResourceConfig or via $N_{RRH}$ higher layer parameters, one for each RRH), where
- each of the $N_{RRH}$ CSI reporting settings configures a CSI reporting for an RRH, and
- each of the $N_{RRH}$ CSI resource setting configures one or more than one CSI-RS resources or resource sets for an RRH.

The $N_{RRH}$ CSI reporting settings and the $N_{RRH}$ CSI resource settings are linked together (e.g. via RRC configuration) for a CSI reporting for a DMIMO system comprising $N_{RRH}$ RRHs.

In addition, for each RRH $r=1, \ldots, N_{RRH}$, the UE is further configured with a codebook $C_r$ of $P_r$ CSI-RS ports. (e.g. via one higher layer parameter codebookType or via $N_{RRH}$ higher layer parameter, one for each RRH). In this case, the UE, rather than using one large codebook of $\Sigma_{r=1}^{N_{RRH}} P_r$ CSI-RS ports, is configured to use $N_{RRH}$ codebooks, each of $P_r$ CSI-RS ports. In one example, codebookType is the same for all RRHs, hence only codebook needs to be configured that is the same for all RRHs. In one example, codebookType can be the same or different across all RRHs, hence $N_{RRH}$ codebooks need to be configured that can be the same or different across all RRHs. In one example, $P_r=p$ implying the same number of CSI-RS ports for all RRHs. In one example, $P_r$ can be different across RRHs.

Alternatively, the UE is configured with one codebook for $\Sigma_{r=1}^{N_{RRH}} P_r$ CSI-RS ports (across multiple CSI resources or resource sets). Or, the UE is configured with one codebook for $P_r=p$ ports (when the same number of CSI-RS ports for all RRHs). Or, the UE is configured with $N_{RRH}$ codebooks, each for $P_r$ CSI-RS ports (when different number of CSI-RS ports across all RRHs).

In one embodiment III.5, a UE is configured with one or multiple CSI reporting settings and one or multiple CSI resource settings according to at least one of embodiments III.1 through III.4 (or variations III.1.A/B/C/D, III.2.A, III.3.A/B), where the CSI reporting(s) is (are) such that the UE can report all of or a subset of the $N_{RRH}$ CSI reports (or all of or a subset of the $N_{RRH}$ components of the CSI report) dynamically, i.e., the UE reports $K \leq N_{RRH}$ CSI reports (components), {CSI(k), k=0, 1, \ldots, K-1}.

At least one of the following examples is used/configured for the value of K.

In one example III.5.1, the value of K is fixed, e.g.

$$K = \frac{N_{RRH}}{2}.$$

In one example III.5.2, the value of K is configured to the UE. This configuration can be via RRC, or MAC CE, or DCI, or a combination of at least two of RRC, MAC CE, and DCI.

In one example III.5.3, the value of K is chosen by the UE. The UE can report the chosen value as part of the CSI report, as a separate CSI parameter or jointly with another parameter (e.g. RI, CRI etc.).

In one example III.5.4, the value of K is determined/configured/reported subject to the UE capability reported by the UE.

If the value of K is chosen dynamically by by the UE, the K CSI reports (components) can be partitioned into two parts, CSI part 1 and CSI part 2. In one example, the CSI part 1 and part 2 are as follows.

The CSI part 1 includes $k_1 < K$ CSI reports, where $k_1$ is fixed or configured (e.g. $k_1=1$), and an indication about the remaining $k_2=K-k_1$ CSI reports. This information can be a bitmap of length $N_{RRH}$. The payload (number of bits) of the CSI part 1 is fixed.

The CSI part 2 includes the remaining $k_2$ CSI reports. The payload of the CSI part 2 is variable depending on the value of $k_2$. In one example, $k_2=0$ is allowed. In one example, $k_2>0$.

The two parts of the CSI report can be transmitted (reported) by the UE via a two-part UCI (cf. Rel. 15 two-part UCI).

In one embodiment III.6, each CSI report (or each component of the CSI report) (cf. embodiment III.1 through III.5) includes at least (RI, PMI, CQI), and possibly CRI if multiple CSI-RS resources are configured to an RRH. Alternatively, each CSI report includes at least (RI, PMI, CQI), and possibly CRI if multiple CSI-RS resources are configured to an RRH, and also includes a timing/phase offset parameter which corresponds to the phase/timing offset across RRHs. Alternatively, each CSI report includes at least (RI, PMI, CQI), and possibly CRI if multiple CSI-RS resources are configured to an RRH, and also includes a timing/phase offset parameter which corresponds to the phase/timing offset across RRHs, and an amplitude/power parameter which corresponds to the amplitude/power level across RRHs.

In one example, a timing/phase offset parameter (or amplitude/power parameter) is reported for each RRH of the $N_{RRH}$ (or K) RRHs. In another example, a timing/phase offset parameter (or amplitude/power parameter) is reported for all but one RRH, i.e., for each RRH of the $N_{RRH}-1$ (or K−1) RRHs; and a timing/phase offset parameter (or amplitude/power parameter) is not reported for one RRH (which serves as a reference). The index of reference RRH can be fixed (e.g. 1 or the first RRH), or configured (e.g. via RRH or/and MAC CE or/and DCI), or reported by the UE (e.g. as part of the CSI report via a separate CSI parameter or together with an existing parameter). In one example, the reference RRH is referred to as a strongest RRH.

At least one of the following examples can be used/configured for the content of each CSI report (cf. embodiment III.1 through III.5).

In one example III.6.1, a UE is configured with a CSI resource setting that is linked with a CSI reporting setting, where the CSI resource setting includes $N_{RRH}$ NZP CSI-RS resources (e.g. in a single CSI-RS resource set or in $N_{RRH}$ CSI-RS resource sets each including one CSI-RS resource), one for each RRH, the details of the CSI resource configuration are according to some embodiments of this disclosure. The CSI reporting setting configures multiple CSI reports (e.g. one report associated with each RRH) or one CSI report comprising multiple components (e.g. one component associated with each RRH). The CSI reporting setting includes a parameter (e.g. via higher layer parameter reportQuantity) that is set to 'RI-PMI-CQI' indicating that the content of each CSI report (or each component of the CSI report) includes RI, PMI, and CQI. Or, optionally, the CSI reporting setting includes a parameter (e.g. via higher layer parameter reportQuantity) that is set to 'RI-LI-PMI-CQI' indicating that the content of each CSI report (or each component of the CSI report) includes RI, LI, PMI, and CQI. Or, optionally, the CSI reporting setting includes a parameter (e.g. via higher layer parameter reportQuantity) that is set to 'RI-PMI-CQI-OI' or 'RI-LI-PMI-CQI-OI' indicating that the content of each CSI report (or each component of the CSI report) also includes OI for a timing/phase offset or/and an amplitude/power parameter (in addition to RI, PMI, CQI and LI). As explained above, in one example, OI is reported for each RRH, or is reported for all but one RRH (i.e. reference RRH).

In a variation, a UE is configured with a CSI resource setting that is linked with multiple CSI reporting settings, one for each RRH. Each reporting setting configures a CSI report for an RRH. The rest of the details are the same as in example III.6.1. In one example, each CSI reporting setting includes a parameter (e.g. via higher layer parameter reportQuantity) configuring the content of the CSI report, where the values of these parameters are the same. In one example, each CSI reporting setting includes a parameter (e.g. via higher layer parameter reportQuantity) configuring the content of the CSI report, where the values of these parameters can be the same or different. In one example, only one of the multiple CSI reporting settings includes a parameter (e.g. via higher layer parameter reportQuantity) configuring the content of the CSI report, and the remaining of the CSI reporting settings do not include this parameter. In one example, none of the CSI reporting settings includes this parameter, and this parameter is configured separately (e.g. via a separate RRC parameter).

In a variation (example III.6.1.A), which is similar to embodiment III.1.A, the CSI resource setting configures one CSI-RS resource comprising $P=\Sigma_{r=1}^{N_{RRH}} P_r$ CSI-RS ports, which can be partitioned into $N_{RRH}$ port groups $g_1, \ldots g_{N_{RRH}}$, the port group $g_r$ is associated with r-th RRH and comprises $P_r$ CSI-RS ports. In one example, the CSI-RS ports $0, 1, \ldots, P_1-1$ comprises the port group $g_1$, the CSI-RS ports $P_1, P_1+1, \ldots, P_1+P_2-1$ comprises the port group $g_2$, and so on. In general, the CSI-RS ports $\Sigma_{t=1}^{r-1} P_t, \Sigma_{t=1}^{r-1} P_t+1, \ldots, \Sigma_{t=1}^{r} P_t-1$ comprises the port group $g_r$, where $\Sigma_{t=1}^{-1} P_t=0$. The CSI reporting setting is the same as in example III.6.1, except that each CSI report (or each component of the CSI report) is determined based on a port group $g_r$.

In a variation, a UE is configured with a CSI resource setting that is linked with multiple CSI reporting settings, one for each RRH. Each reporting setting configures a CSI report for an RRH. The rest of the details are the same as in example III.6.1.A. In one example, each CSI reporting setting includes a parameter (e.g. via higher layer parameter reportQuantity) configuring the content of the CSI report, where the values of these parameters are the same. In one example, each CSI reporting setting includes a parameter (e.g. via higher layer parameter reportQuantity) configuring the content of the CSI report, where the values of these parameters can be the same or different. In one example, only one of the multiple CSI reporting settings includes a parameter (e.g. via higher layer parameter reportQuantity) configuring the content of the CSI report, and the remaining of the CSI reporting settings do not include this parameter. In one example, none of the CSI reporting settings includes this parameter, and this parameter is configured separately (e.g. via a separate RRC parameter).

In a variation (example III.6.1.B), which is similar to embodiment III.1.A, the CSI resource setting configures multiple CSI-RS resources, each comprising $P=\Sigma_{r=1}^{N_{RRH}} P_r$ CSI-RS ports, which can be partitioned into $N_{RRH}$ port groups $g_1, \ldots g_{N_{RRH}}$, the port group $g_r$ is associated with r-th RRH and comprises $P_r$ CSI-RS ports. In one example, the CSI-RS ports $0, 1, \ldots, P_1-1$ comprises the port group $g_1$, the CSI-RS ports $P_1, P_1+1, \ldots, P_1+P_2-1$ comprises the port group $g_2$, and so on. In general, the CSI-RS ports $\Sigma_{t=1}^{r-1} P_t, \Sigma_{t=1}^{r-1} P_t+1, \ldots, \Sigma_{t=1}^{r} P_t-1$ comprises the port group $g_r$, where $\Sigma_{t=1}^{-1} P_t=0$. The CSI reporting setting is the same as in example III.6.1, except that each CSI report (or each component of the CSI report) is determined based on a port group $g_r$, and a CRI is reported to indicate one of the multiple CSI-RS resources that is selected (by the UE) for the CSI reporting. In this case, the UE reports one CRI and $N_{RRH}$ CSI reports (or components of the CSI report), each including RI, CQI, PMI, and possibly also LI or/and OI.

The CSI reporting setting includes a parameter (e.g. via higher layer parameter reportQuantity) that is set to 'cri-RI-PMI-CQI' indicating that the content of each CSI report (or each component of the CSI report) includes RI, PMI, and CQI. In addition, one CRI is also reported.

Or, optionally, the CSI reporting setting includes a parameter (e.g. via higher layer parameter reportQuantity) that is set to ' cri-RI-LI-PMI-CQI' indicating that the content of each CSI report (or each component of the CSI report) includes RI, LI, PMI, and CQI. In addition, one CRI is also reported.

Or, optionally, the CSI reporting setting includes a parameter (e.g. via higher layer parameter reportQuantity) that is set to ' cri-RI-PMI-CQI-OI' or 'cri-RI-LI-PMI-CQI-OI' indicating that the content of each CSI report (or each component of the CSI report) also includes OI for a timing/phase offset or/and an amplitude/power parameter (in addition to RI, PMI, CQI and LI). In addition, one CRI is also reported.

In a variation, a UE is configured with a CSI resource setting that is linked with multiple CSI reporting settings, one for each RRH. Each reporting setting configures a CSI report for an RRH. The rest of the details are the same as in example III.6.1.B. In one example, each CSI reporting setting includes a parameter (e.g. via higher layer parameter reportQuantity) configuring the content of the CSI report, where the values of these parameters are the same. In one example, each CSI reporting setting includes a parameter (e.g. via higher layer parameter reportQuantity) configuring the content of the CSI report, where the values of these parameters can be the same or different. In one example, only one of the multiple CSI reporting settings includes a parameter (e.g. via higher layer parameter reportQuantity) configuring the content of the CSI report, and the remaining of the CSI reporting settings do not include this parameter. In one example, none of the CSI reporting settings includes this parameter, and this parameter is configured separately (e.g. via a separate RRC parameter).

In one example III.6.2, a UE is configured with a CSI resource setting that is linked with a CSI reporting setting, where the CSI resource setting includes $M > N_{RRH}$ NZP CSI-RS resources, $M = \sum_{r=1}^{N_{RRH}} m_r$ and $m_r$ is number of CSI-RS resource(s) for r-th RRH, i.e., $m_r \geq 1$ for at least one RRH. The M CSI-RS resources can be included in a CSI-RS resource set. Or, the M CSI-RS resources can be included $N_{RRH}$ CSI-RS resource sets, one for each RRH, and an r-th CSI-RS resource set includes $m_r$ CSI-RS resources. The details of the CSI resource configuration are according to some embodiments of this disclosure.

The CSI reporting setting includes a parameter (e.g. via higher layer parameter reportQuantity) that is set to one of Option A and Option B, where Option A: reportQuantity='cri-RI-PMI-CQI' indicating that the content of an r-th CSI report includes RI, PMI, and CQI if $m_r = 1$ and CRI, RI, PMI, and CQI if $m_r > 1$, and CRI indicates one of the $m_r$ CSI-RS resources.

Option B: reportQuantity='RI-PMI-CQI' indicating that the content of an r-th CSI report includes RI, PMI, and CQI, that are determined based on all (aggregated) CSI-RS ports across multiple CSI-RS resources (when $m_r > 1$).

In one example, one of Option A and Option B is fixed in specification. In one example, one of Option A and Option B is configured (e.g. via higher layer or MAC CE or DCI). In one example, one of Option A and Option B is reported by the UE (e.g. as part of the CSI report). In one example, the UE reports via its capability reporting whether it supports one of or both of Option A and Option B.

Or, optionally, the CSI reporting setting includes a parameter (e.g. via higher layer parameter reportQuantity) that is set to one of Option A1 and Option B1, where Option A1: reportQuanti='cri-RI-LI-PMI-CQI' indicating that the content of an r-th CSI report includes RI, LI, PMI, and CQI if $m_r = 1$ and CRI, RI, LI, PMI, and CQI if $m_r > 1$, and CRI indicates one of the $m_r$ CSI-RS resources.

Option B1: reportQuantity='RI-LI-PMI-CQI' indicating that the content of an r-th CSI report includes RI, LI, PMI, and CQI, that are determined based on all (aggregated) CSI-RS ports across multiple CSI-RS resources (when $m_r > 1$).

In one example, one of Option A1 and Option B1 is fixed in specification. In one example, one of Option A1 and Option B1 is configured (e.g. via higher layer or MAC CE or DCI). In one example, one of Option A1 and Option B1 is reported by the UE (e.g. as part of the CSI report). In one example, the UE reports via its capability reporting whether it supports one of or both of Option A1 and Option B1.

Or, optionally, the CSI reporting setting includes a parameter (e.g. via higher layer parameter reportQuantity) that is set to one of Option A2 and Option B2, where Option A2: reportQuantity='cri-RI-PMI-CQI-OI' indicating that the content of an r-th CSI report includes RI, PMI, CQI, and OI if $m_r = 1$ and CRI, RI, PMI, CQI, and OI if $m_r > 1$, and CRI indicates one of the $m_r$ CSI-RS resources. Here, OI indicates a timing/phase offset or/and an amplitude/power parameter.

Option B2: reportQuantity='RI-PMI-CQI-OI' indicating that the content of an r-th CSI report includes RI, PMI, CQI, and OI that are determined based on all (aggregated) CSI-RS ports across multiple CSI-RS resources (when $m_r > 1$). Here, OI indicates a timing/phase offset or/and an amplitude/power parameter.

In one example, one of Option A2 and Option B2 is fixed in specification. In one example, one of Option A2 and Option B2 is configured (e.g. via higher layer or MAC CE or DCI). In one example, one of Option A2 and Option B2 is reported by the UE (e.g. as part of the CSI report). In one example, the UE reports via its capability reporting whether it supports one of or both of Option A2 and Option B2.

Or, optionally, the CSI reporting setting includes a parameter (e.g. via higher layer parameter reportQuantity) that is set to one of Option A3 and Option B3, where Option A3: reportQuantity='cri-RI-LI-PMI-CQI-OI' indicating that the content of an r-th CSI report includes RI, LI, PMI, CQI, and OI if $m_r = 1$ and CRI, RI, LI, PMI, CQI, and OI if $m_r > 1$, and CRI indicates one of the $m_r$ CSI-RS resources. Here, OI indicates a timing/phase offset or/and an amplitude/power parameter.

Option B3: reportQuantity='RI-LI-PMI-CQI-OI' indicating that the content of an r-th CSI report includes RI, LI, PMI, CQI, and OI that are determined based on all (aggregated) CSI-RS ports across multiple CSI-RS resources (when $m_r > 1$). Here, OI indicates a timing/phase offset or/and an amplitude/power parameter.

In one example, one of Option A3 and Option B3 is fixed in specification. In one example, one of Option A3 and Option B3 is configured (e.g. via higher layer or MAC CE or DCI). In one example, one of Option A3 and Option B3 is reported by the UE (e.g. as part of the CSI report). In one example, the UE reports via its capability reporting whether it supports one of or both of Option A3 and Option B3.

In a variation, a UE is configured with a CSI resource setting that is linked with multiple CSI reporting settings, one for each RRH. Each reporting setting configures a CSI report for an RRH. The rest of the details are the same as in example III.6.2. In one example, each CSI reporting setting includes a parameter (e.g. via higher layer parameter reportQuantity) configuring the content of the CSI report, where the values of these parameters are the same. In one example, each CSI reporting setting includes a parameter (e.g. via higher layer parameter report-Quantity) configuring the content of the CSI report, where the values of these parameters can be the same or different. In one example, only one of the multiple CSI reporting settings includes a parameter (e.g. via higher layer parameter reportQuantity) configuring the content of the CSI report, and the remaining of the CSI reporting settings do not include this parameter. In one example, none of the CSI reporting settings includes this parameter, and this parameter is configured separately (e.g. via a separate RRC parameter).

In one example, the codebookType in above embodiments/examples can only be a Type II codebook as described in TS 38.214, section 5.2.2.2.3 through 5.2.2.2.7, i.e., the UE is expected to be configured with a codebookType (or multiple codebookTypes) set to one of the Type II codebooks.

In one example, the codebookType in above embodiments/examples can only be a Type I codebook as described in TS 38.214, section 5.2.2.2.1 through 5.2.2.2.2, i.e., the UE is expected to be configured with a codebookType (or multiple codebookTypes) set to one of the Type I codebooks.

In one example, the codebookType in above embodiments/examples can be a Type I or a Type II codebook as described in TS 38.214, section 5.2.2.2.1 through 5.2.2.2.7, i.e., the UE is expected to be configured with a codebookType (or multiple codebookTypes) set to one of the Type I or Type II codebooks.

In one embodiment III.7, the payload (number of bits) of OI reporting is $N_{OI}$ bits. In one example, $N_{OI}$ is fixed.

In one example, $N_{OI} = 2$. The codebook for OI reporting is QPSK $\{1, j, -1, -j\}$ or $$\left\{ e^{\frac{jn\pi}{2}} : n = 0, 1, 2, 3 \right\}.$$

In one example, $N_{OI}=3$. The codebook for OI reporting is 8-PSK $$\left\{ e^{\frac{jn\pi}{4}} : n = 0, 1, \ldots, 7 \right\}.$$

In one example, $N_{OI} \geq 2$. The codebook for OI reporting is $2^{N_{OI}}$-PSK $$\left\{ e^{\frac{jn\pi}{2^{N_{OI}-1}}} \text{ or } e^{\frac{2jn\pi}{2^{N_{OI}}}} : n = 0, 1, \ldots, 2^{N_{OI}} - 1 \right\}.$$

In one example, $N_{OI}$ is configured.
In one example, the configuration is via higher layer RRC.
In one example, the configuration is via MAC CE.
In one example, the configuration is via DCI.
In one example, the configuration is via a combination of at least two of RRC, MAC CE, and DCI.
In one example, the OI reporting is via a separate CSI parameter.
In one example, the OI reporting is via an existing CSI parameter, e.g. as a component of PMI.
In one example, the OI reporting is joint with an existing parameter, e.g. joint with PMI or CRI or RI.
In one example, the frequency granularity (or format) or OI reporting is fixed.
  In one example, the frequency granularity (or format) is wideband (WB), i.e., only one OI is reported for the entire CSI reporting band. The payload of the WB component can be $N_{OI}$ bits, as explained above.
  In one example, the frequency granularity (or format) is subband (SB), i.e., one OI is reported for each SB in the entire CSI reporting band. The payload of the SB component can be $N_{OI}$ bits, as explained above.
  In one example, the frequency granularity (or format) is subband (SB) with respect to (w.r.t.) to a reference or WB component, i.e., it is WB+SB. Hence, one reference (WB) component is reported for the entire CSI reporting band, and one OI is reported for each SB in the entire CSI reporting band. The payload of the WB component can be $N_{OI}$ bits, as explained above. The payload of the SB component can be $N_{OI,SB}$, where $N_{OI,SB} \leq N_{OI}$.
  In one example, $N_{OI,SB}=1$ is fixed. The codebook for SB OI reporting is $\{1, -1\}$ or $$\left\{ -\frac{\pi}{4}, \frac{\pi}{4} \right\} \text{ or } \left\{ 0, \frac{\pi}{2} \right\} \text{ or } \left\{ -\frac{\pi}{2}, 0 \right\} \text{ or } \left\{ -\frac{\pi}{2^{N_{OI}}}, \frac{\pi}{2^{N_{OI}}} \right\}.$$

In one example, the frequency granularity (or format) or OI reporting is configured.
  In one example, it is configured from WB and SB, or from WB and WB+SB, or from WB, SB, and WB+SB. The details of these are as explained above.
In one embodiment III.8, an RRH constitutes (or corresponds to or is equivalent to) at least one of the following:
  In one example III.8.1, an RRH corresponds to a TRP.

In one example III.8.2, an RRH corresponds to a CSI-RS resource. A UE is configured with $K=N_{RRH}>1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g. K resource sets each comprising one CSI-RS resource). The details are as explained earlier in this disclosure.

In one example III.8.3, an RRH corresponds to a CSI-RS resource group, where a group comprises one or multiple NZP CSI-RS resources. A UE is configured with $K \geq N_{RRH}>1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g. K resource sets each comprising one CSI-RS resource). The details are as explained earlier in this disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.

In one example III.8.4, an RRH corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.

In one example III.8.5, an RRH corresponds to example III.8.2/3 or III.8.4 depending on a configuration. For example, this configuration can be explicit via a parameter (e.g. an RRC parameter). Or, it can be implicit.
  In one example, when implicit, it could be based on the value of K. For example, when K>1 CSI-RS resources, an RRH corresponds to example III.8.2.2/3, and when K=1 CSI-RS resource, an RRH corresponds to example III.8.4.
  In another example, the configuration could be based on the configured codebook. For example, an RRH corresponds to a CSI-RS resource (example III.8.2) or resource group (III.8.3) when the codebook corresponds to a decoupled codebook (modular or separate codebook for each RRH), and an RRH corresponds to a subset (or a group) of CSI-RS ports (example III.8.3) when codebook corresponds to a coupled (joint or coherent) codebook (one joint codebook across RRHs).

In one example, when RRH maps (or corresponds to) a CSI-RS resource or resource group (example III.8.2/3), and a UE can select a subset of RRHs (resources or resource groups) and report the CSI for the selected RRHs (resources or resource groups), the selected RRHs can be reported via an indicator. For example, the indicator can be a CRI or a PMI (component) or a new indicator.

In one example, when RRH maps (or corresponds to) a CSI-RS port group (example III.8.4), and a UE can select a subset of RRHs (port groups) and report the CSI for the selected RRHs (port groups), the selected RRHs can be reported via an indicator. For example, the indicator can be a CRI or a PMI (component) or a new indicator.

In one example, when multiple (K>1) CSI-RS resources are configured for $N_{RRH}$ RRHs (example III.8.2/3), a decoupled (modular) codebook is used/configured, and when a single (K=1) CSI-RS resource for $N_{RRH}$ RRHs (example III.8.4), a joint codebook is used/configured.

In one embodiment III.9, the CSI parameters/indicators are reported according to at least one of the following examples.

In one example, all CSI parameters/indicators are reported separately (independently) for each RRH/TRP. The CSI parameters/indicators can include PMI, CQI, RI, CRI (reported if multiple CSI-RS resources are configured), LI (reported if configured), OI (reported if configured).

In one example, a first subset of all CSI parameters/indicators are reported separately (independently) for each RRH/TRP, and a second subset of CSI parameters/indicators are reported jointly (i.e. only one indicator/parameter is reported).

In one example, the first subset includes PMI, CRI (if reported), LI (if reported), OI (if reported), and the second subset includes CQI and RI.

In one example, the first subset includes PMI, LI (if reported), OI (if reported), and the second subset includes CRI (if reported), CQI and RI.

In one example, the first subset includes PMI, CQI, CRI (if reported), LI (if reported), OI (if reported), and the second subset includes RI.

In one example, the first subset includes PMI, CQI, LI (if reported), OI (if reported), and the second subset includes CRI (if reported) and RI.

In one example, all CSI parameters/indicators are reported jointly (i.e. only one indicator/parameter is reported) across RRHs/TRPs. The CSI parameters/indicators can include PMI, CQI, RI, CRI (reported if multiple CSI-RS resources are configured), LI (reported if configured), OI (reported if configured).

Any of the above variation embodiments can be utilized independently or in combination with at least one other variation embodiment.

Figure 13:
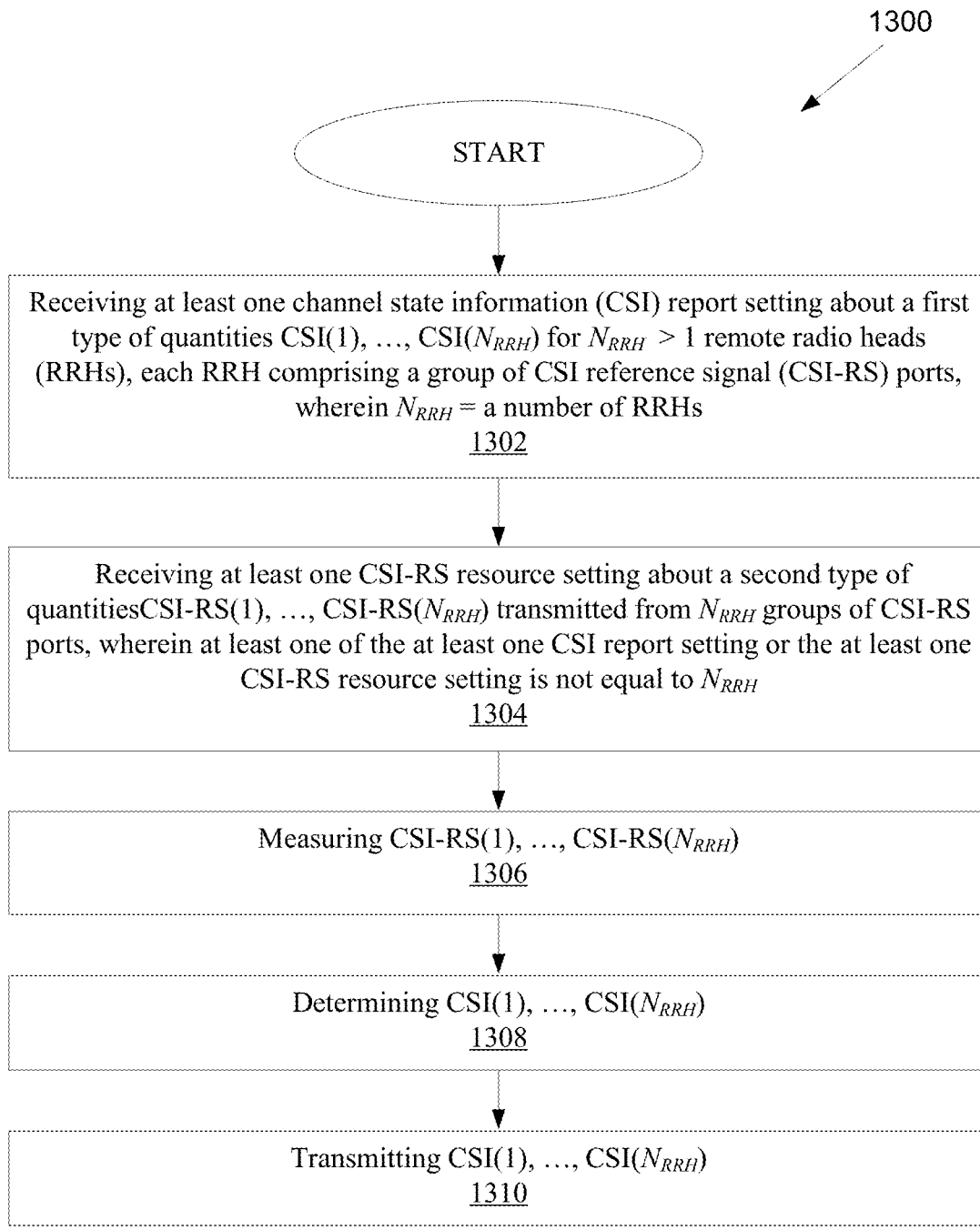
FIG. 13 illustrates a flow chart of a method for operating a UE according to embodiments of the present disclosure.

FIG. 13 illustrates a flow chart of a method 1300 for operating a user equipment (UE), as may be performed by a UE such as UE 116, according to embodiments of the present disclosure. The embodiment of the method 1300 illustrated in FIG. 13 is for illustration only. FIG. 24 does not limit the scope of this disclosure to any particular implementation.

As illustrated in FIG. 13, the method 1300 begins at step 1302. In step 1302, the UE (e.g., 111-116 as illustrated in FIG. 1) receives at least one channel state information (CSI) report setting about a first type of quantities CSI(1), . . . , CSI($N_{RRH}$) for $N_{RRH}$>1 remote radio heads (RRHs), each RRH comprising a group of CSI reference signal (CSI-RS) ports, wherein $N_{RRH}$=a number of RRHs.

In step 1304, the UE receives at least one CSI-RS resource setting about a second type of quantities CSI-RS (1), . . . , CSI-RS($N_{RRH}$) transmitted from $N_{RRH}$ groups of CSI-RS ports, wherein at least one of the at least one CSI report setting or the at least one CSI-RS resource setting is not equal to $N_{RRH}$; and In step 1306, the UE measures CSI-RS(1), . . . , CSI-RS ($N_{RRH}$).

In step 1308, the UE determines, based on the measurement, CSI(1), . . . , CSI($N_{RRH}$), In step 1310, the UE transmits CSI(1), . . . , CSI($N_{RRH}$).

In one embodiment, CSI(1), . . . , CSI($N_{RRH}$) are $N_{RRH}$ separate CSI reports, or CSI(1), . . . , CSI($N_{RRH}$) are $N_{RRH}$ components included in a CSI report.

In one embodiment, CSI-RS(1), . . . , CSI-RS($N_{RRH}$) are associated with a single CSI-RS resource with $P=\Sigma_{r=1}^{N_{RRH}} P_r$ CSI-RS ports, CSI-RS(r) corresponds to a portion of the single CSI-RS resource that is transmitted from $P_r$ ports comprising r-th group of CSI-RS ports, and a CSI-RS resource indicator (CRI) indicating one out of multiple CSI-RS resources is reported when the UE is configured with multiple CSI-RS resources, each with P CSI-RS ports, via the at least one CSI-RS resource setting.

In one embodiment, for r=1, . . . , $N_{RRH}$:CSI-RS(r) is a separate CSI-RS resource for r-th RRH, and a CSI-RS resource indicator (CRI) indicating one out of multiple CSI-RS resources is included in CSI(r) when the UE is configured with multiple CSI-RS resources for r-th RRH.

In one embodiment, for r=1, . . . , $N_{RRH}$, a phase or timing offset is included in CSI(r) associated with r-th RRH.

In one embodiment, the at least one CSI-RS resource setting corresponds to one CSI-RS resource setting, and the at least one CSI report setting corresponds to $N_{RRH}$ CSI report settings.

In one embodiment, the at least one CSI-RS resource setting corresponds to $N_{RRH}$ CSI-RS resource settings, and the at least one CSI report setting corresponds to one CSI report setting.

In one embodiment, the at least one CSI-RS resource setting corresponds to one CSI-RS resource setting, and the at least one CSI report setting corresponds to one CSI report setting.

Figure 14:
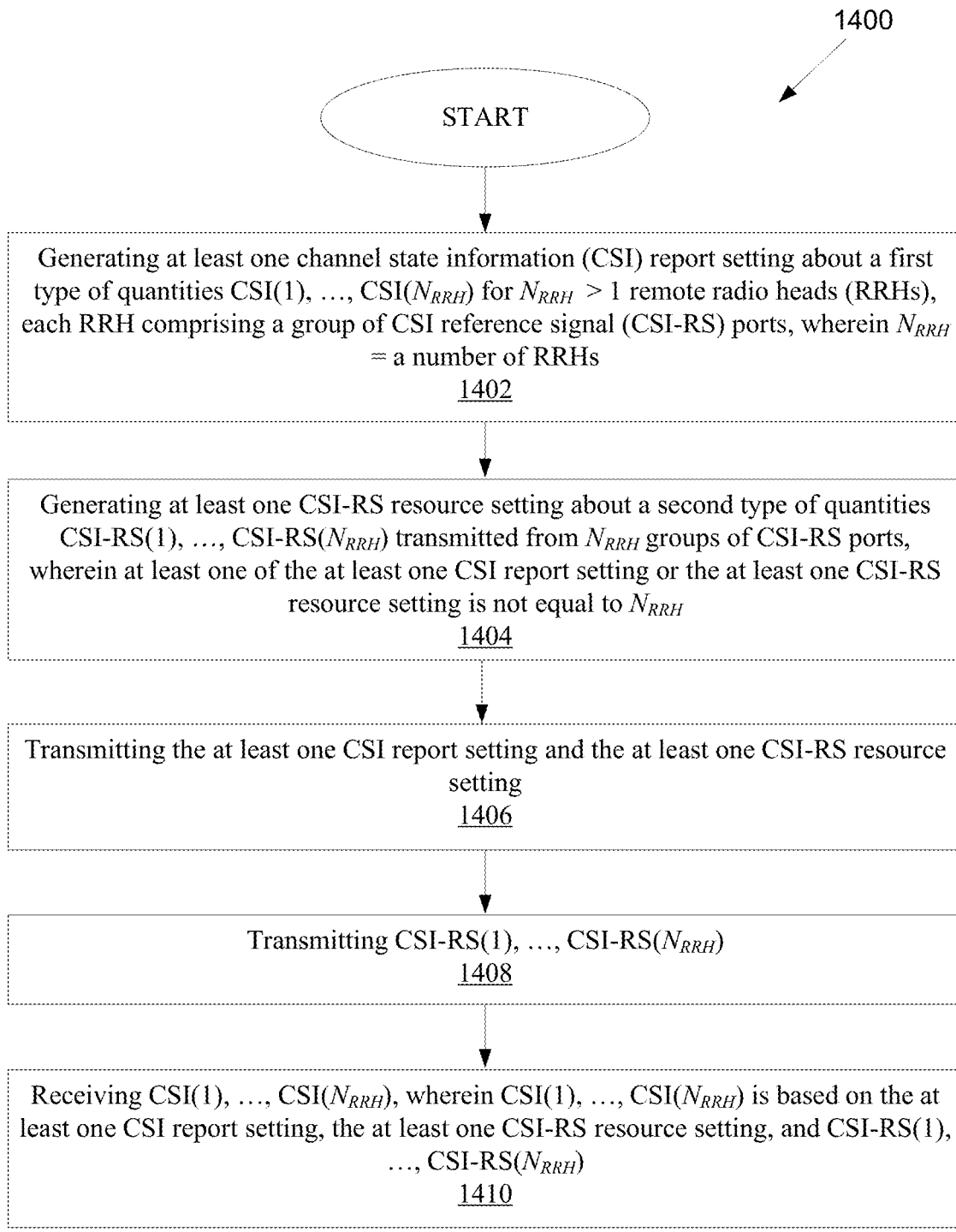
FIG. 14 illustrates a flow chart of a method for operating a BS according to embodiments of the present disclosure.

FIG. 14 illustrates a flow chart of another method 1400, as may be performed by a base station (BS) such as BS 102, according to embodiments of the present disclosure. The embodiment of the method 1400 illustrated in FIG. 1400 is for illustration only. FIG. 14 does not limit the scope of this disclosure to any particular implementation.

As illustrated in FIG. 14, the method 1400 begins at step 1402. In step 1402, the BS (e.g., 101-103 as illustrated in FIG. 1), generates at least one channel state information (CSI) report setting about a first type of quantities CSI(1), . . . , CSI($N_{RRH}$) for $N_{RRH}$>1 remote radio heads (RRHs), each RRH comprising a group of CSI reference signal (CSI-RS) ports, wherein $N_{RRH}$=a number of RRHs.

In step 1404, the BS generates at least one CSI-RS resource setting about a second type of quantities CSI-RS (1), . . . , CSI-RS($N_{RRH}$) transmitted from $N_{RRH}$ groups of CSI-RS ports, wherein at least one of the at least one CSI report setting or the at least one CSI-RS resource setting is not equal to $N_{RRH}$.

In step 1406, the BS transmits the at least one CSI report setting and the at least one CSI-RS resource setting.

In step 1408, the BS transmits CSI-RS(1), . . . , CSI-RS ($N_{RRH}$).

In step 1410, the BS receives CSI(1), . . . , CSI($N_{RRH}$), wherein CSI(1), . . . , CSI($N_{RRH}$) is based on the at least one CSI report setting, the at least one CSI-RS resource setting, and CSI-RS(1), . . . , CSI-RS($N_{RRH}$).

In one embodiment, CSI(1), . . . , CSI($N_{RRH}$) are $N_{RRH}$ separate CSI reports, or CSI (1), . . . , CSI($N_{RRH}$) are $N_{RRH}$ components included in a CSI report.

In one embodiment, CSI-RS(1), . . . , CSI-RS($N_{RRH}$) are associated with a single CSI-RS resource with $P=\Sigma_{r=1}^{N_{RRH}} P_r$ CSI-RS ports, CSI-RS(r) corresponds to a portion of the single CSI-RS resource that is transmitted from $P_r$ ports comprising r-th group of CSI-RS ports, and the BS is configured to receive a CSI-RS resource indicator (CRI) indicating one out of multiple CSI-RS resources, when the multiple CSI-RS resources, each with P CSI-RS ports, are configured via the at least one CSI-RS resource setting.

In one embodiment, for r=1, . . . , $N_{RRH}$:CSI-RS(r) is a separate CSI-RS resource for r-th RRH, and a CSI-RS resource indicator (CRI) indicating one out of multiple CSI-RS resources is included in CSI(r), when the multiple CSI-RS resources are configured for r-th RRH.

In one embodiment, for r=1, . . . , $N_{RRH}$, a phase or timing offset is included in CSI(r) associated with r-th RRH.

In one embodiment, the at least one CSI-RS resource setting corresponds to one CSI-RS resource setting, and the at least one CSI report setting corresponds to $N_{RRH}$ CSI report settings.

In one embodiment, the at least one CSI-RS resource setting corresponds to $N_{RRH}$ CSI-RS resource settings, and the at least one CSI report setting corresponds to one CSI report setting.

In one embodiment, the at least one CSI-RS resource setting corresponds to one CSI-RS resource setting, and the at least one CSI report setting corresponds to one CSI report setting.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
 a transceiver configured to:
  receive a channel state information (CSI) report setting about a first type of quantities CSI(1), . . . , CSI(N) for N>1 groups of CSI reference signal (CSI-RS) ports; and
  receive a CSI-RS resource setting about a second type of quantities CSI-RS(1), . . . , CSI-RS(K) transmitted from K groups of CSI-RS ports, where K>N; and
 a processor operably coupled to the transceiver, the processor configured to, based on the CSI report setting and the CSI-RS resource setting:
  measure CSI-RS(1), . . . , CSI-RS(K); and
  determine, based on the measurement, CSI(1), . . . , CSI(N),
 wherein the transceiver is further configured to transmit CSI(1), . . . , CSI(N),
 wherein CSI(1), . . . , CSI(N) are N separate CSI reports, and
 wherein for r=1, . . . , K, CSI-RS(r) is transmitted from one of the groups of CSI-RS ports associated with a CSI-RS resource.

2. The UE of claim 1, wherein, for j=1, . . . , N;
 a CSI-RS resource indicator (CRI), indicating one out of the second type quantities CSI-RS(1), . . . , CSI-RS(K), is included in CSI(j).

3. The UE of claim 1, wherein for j=1, . . . , N, a phase or timing offset or amplitude is included in CSI(j) associated with r-th group of CSI-RS ports.

4. The UE of claim 1, wherein:
 the CSI-RS resource setting corresponds to one CSI-RS resource setting, and
 the CSI report setting corresponds to one CSI report setting.

5. The UE of claim 1, wherein for j=1, . . . , N, CSI(j) includes one of:
 RI(j), CQI(j), and PMI(j) or
 LI(j), RI(j), CQI(j), and PMI(j).

6. The UE of claim 5, wherein for a subset S of {1, . . . , N}:
 when j∈S, CSI(j) includes CRI(j), and
 when j∉S, CSI(j) does not include CRI(j).

7. The UE of claim 6, wherein the CSI report setting includes information about a codebook that is common for PMI(1), . . . , PMI(N), where the codebook corresponds to a codebookType set to Type I or Type II.

8. A base station (BS) comprising:
 a processor configured to:
  generate a channel state information (CSI) report setting about a first type of quantities CSI(1), . . . , CSI(N) for N>1 groups of CSI reference signal (CSI-RS) ports; and
  generate a CSI-RS resource setting about a second type of quantities CSI-RS(1), . . . , CSI-RS(K) transmitted from K groups of CSI-RS ports, where K>N; and
 a transceiver operably coupled to the processor, the transceiver configured to:
  transmit the CSI report setting and the CSI-RS resource setting;
  transmit CSI-RS(1), . . . , CSI-RS(K); and
  receive CSI(1), . . . , CSI(N),
 wherein CSI(1), . . . , CSI(N) is based on the CSI report setting, the CSI-RS resource setting, and CSI-RS(1), . . . , CSI-RS(N),
 wherein CSI(1), . . . , CSI(N) are N separate CSI reports, and
 wherein for r=1, . . . , K, CSI-RS(r) is received from one of the groups of CSI-RS ports associated with a CSI-RS resource.

9. The BS of claim 8, wherein, for j=1, . . . , N;
 a CSI-RS resource indicator (CRI), indicating one out of the second type quantities CSI-RS(1), . . . , CSI-RS(K), is included in CSI(j).

10. The BS of claim 8, wherein for j=1, . . . , N, a phase or timing offset or amplitude is included in CSI(j) associated with r-th group of CSI-RS ports.

11. The BS of claim 8, wherein:
 the CSI-RS resource setting corresponds to one CSI-RS resource setting, and
 the CSI report setting corresponds to one CSI report setting.

12. The BS of claim 8, wherein for j=1, . . . , N, CSI(j) includes one of:
 RI(j), CQI(j), and PMI(j) or
 LI(j), RI(j), CQI(j), and PMI(j).

13. The BS of claim 12, wherein for a subset S of {1, . . . , N}:
 when j∈S, CSI(j) includes CRI(j), and
 when j∉S, CSI(j) does not include CRI(j).

14. The BS of claim 13, wherein the CSI report setting includes information about a codebook that is common for PMI(1), ..., PMI(N), where the codebook corresponds to a codebookType set to Type I or Type II.

15. A method for operating a user equipment (UE), the method comprising:
receiving a channel state information (CSI) report setting about a first type of quantities CSI(1), ..., CSI(N) for N>1 groups of CSI reference signal (CSI-RS) ports;
receiving a CSI-RS resource setting about a second type of quantities CSI-RS(1), ..., CSI-RS(K) transmitted from K groups of CSI-RS ports, where K>N; and
based on the CSI report setting and the CSI-RS resource setting:
measuring CSI-RS(1), ..., CSI-RS(K); and
determining, based on the measurement, CSI(1), ..., CSI(N); and
transmitting CSI(N),
wherein CSI(1), ..., CSI(N) are N separate CSI reports, and
wherein for r=1, ..., K, CSI-RS(r) is transmitted from one of the groups of CSI-RS ports associated with a CSI-RS resource.

16. The method of claim 15, wherein, for j=1, ..., N:
a CSI-RS resource indicator (CRI), indicating one out of the second type quantities CSI-RS(1), ..., CSI-RS(K), is included in CSI(j).

17. The method of claim 15, wherein for j=1, ..., N, CSI(j) includes one of:
RI(j), CQI(j), and PMI(j) or
LI(j), RI(j), CQI(j), and PMI(j).

18. The method of claim 17, wherein for a subset S of $\{1, \ldots, N\}$:
when $j \in S$, CSI(j) includes CRI(j), and
when $j \notin S$, CSI(j) does not include CRI(j).

19. The method of claim 18, wherein the CSI report setting includes information about a codebook that is common for PMI(1), ..., PMI(N), where the codebook corresponds to a codebookType set to Type I or Type II.

* * * * *